United States Patent
Chandran et al.

(10) Patent No.: US 12,107,675 B2
(45) Date of Patent: Oct. 1, 2024

(54) METHOD AND APPARATUS FOR IMPROVING A THROUGHPUT FOR A USER EQUIPMENT IN A WIRELESS NETWORK SYSTEM

(71) Applicant: Samsung Electronics Co., Ltd., Suwon-si (KR)

(72) Inventors: Ramesh Chandran, Bangalore (IN); Amarpreet Singh Sethi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 401 days.

(21) Appl. No.: 17/517,044

(22) Filed: Nov. 2, 2021

(65) Prior Publication Data

US 2022/0123853 A1    Apr. 21, 2022

Related U.S. Application Data

(63) Continuation of application No. PCT/KR2021/014353, filed on Oct. 15, 2021.

(30) Foreign Application Priority Data

Oct. 15, 2020  (IN) .............................. 202041045006
Oct. 8, 2021   (IN) ........................... 2020 41045006

(51) Int. Cl.
  *H04L 1/00*      (2006.01)
  *H04L 1/1812*    (2023.01)
  (Continued)

(52) U.S. Cl.
  CPC .......... *H04L 1/0002* (2013.01); *H04L 1/1812* (2013.01); *H04L 5/0048* (2013.01); *H04L 43/0888* (2013.01)

(58) Field of Classification Search
  CPC ... H04L 1/0002; H04L 1/1812; H04L 5/0048; H04L 43/0888; H04L 1/0003; H04L 1/0006; H04L 5/0085
  See application file for complete search history.

(56) References Cited

U.S. PATENT DOCUMENTS

| 9,800,486 B2 | 10/2017 | Singh Ashta et al. |
| 2009/0147866 A1 | 6/2009 | She et al. |

(Continued)

FOREIGN PATENT DOCUMENTS

| KR | 10-2015-0093161 A | 8/2015 |
| WO | 2015/165514 A1 | 11/2015 |

(Continued)

OTHER PUBLICATIONS

International Search Report and Written Opinion dated Jan. 21, 2022, issued in International Patent Application No. PCT/KR2021/014353.

(Continued)

*Primary Examiner* — Ayaz R Sheikh
*Assistant Examiner* — Mang Boi Thawng
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure provides a method and a system for 5G New Radio (NR) based gNodeBs (gNBs) under multiple Connected User Equipment (UE) scenarios in a fast-fading (Continued)

environment in order to get better channel estimates at the UE side for throughput improvement by reducing packet decoding failure.

18 Claims, 30 Drawing Sheets

(51) Int. Cl.
*H04L 5/00* (2006.01)
*H04L 43/0888* (2022.01)

(56) References Cited

U.S. PATENT DOCUMENTS

| | | | |
|---|---|---|---|
| 2009/0303946 A1* | 12/2009 | Yokoyama | H04L 5/006 370/329 |
| 2010/0023830 A1* | 1/2010 | Wengerter | H04L 1/0025 370/479 |
| 2011/0117915 A1* | 5/2011 | Chang | H04B 17/24 455/67.11 |
| 2013/0033989 A1 | 2/2013 | Barbieri et al. | |
| 2015/0288483 A1* | 10/2015 | Sun | H04L 1/0003 370/329 |
| 2016/0205677 A1 | 7/2016 | Kim et al. | |
| 2016/0254893 A1 | 9/2016 | Yang et al. | |
| 2017/0118706 A1 | 4/2017 | Wang et al. | |
| 2018/0278390 A1 | 9/2018 | Yakada et al. | |
| 2019/0097750 A1* | 3/2019 | Sandberg | H04L 1/0035 |
| 2019/0305911 A1* | 10/2019 | Sarkis | H04L 5/0057 |
| 2020/0008178 A1 | 1/2020 | Zhang et al. | |
| 2020/0106581 A1 | 4/2020 | Nammi et al. | |
| 2020/0169364 A1* | 5/2020 | Hao | H04L 5/0044 |
| 2020/0328861 A1 | 10/2020 | Malladi et al. | |
| 2020/0351053 A1* | 11/2020 | Werner | H04L 25/0226 |
| 2021/0036799 A1* | 2/2021 | Weng | H04L 1/1607 |
| 2023/0052478 A1* | 2/2023 | Ren | H04W 72/1273 |

FOREIGN PATENT DOCUMENTS

| | | |
|---|---|---|
| WO | 2015/188856 A1 | 12/2015 |
| WO | 2019/182486 A1 | 9/2019 |
| WO | 2020/068313 A1 | 4/2020 |

OTHER PUBLICATIONS

Indian Office Action dated Jun. 8, 2022, issued in Indian Patent Application No. 202041045006.
Indian Notice of Hearing dated Aug. 8, 2024, issued in Indian Patent Application No. 202041045006.

* cited by examiner

| Duration in symbols | DM-RS positions $\bar{l}$ | | | | | | | |
|---|---|---|---|---|---|---|---|---|
| | PDSCH mapping type A | | | | PDSCH mapping type B | | | |
| | dmrs-AdditionalPosition | | | | dmrs-AdditionalPosition | | | |
| | 0 | 1 | 2 | 3 | 0 | 1 | 2 | 3 |
| 2 | - | - | - | - | $l_0$ | $l_0$ | | |
| 3 | $l_0$ | $l_0$ | $l_0$ | $l_0$ | - | - | | |
| 4 | $l_0$ | $l_0$ | $l_0$ | $l_0$ | $l_0$ | $l_0$ | | |
| 5 | $l_0$ | $l_0$ | $l_0$ | $l_0$ | - | - | | |
| 6 | $l_0$ | $l_0$ | $l_0$ | $l_0$ | $l_0$ | $l_0,4$ | | |
| 7 | $l_0$ | $l_0$ | $l_0$ | $l_0$ | $l_0$ | $l_0,4$ | | |
| 8 | $l_0$ | $l_0,7$ | $l_0,7$ | $l_0,7$ | - | - | | |
| 9 | $l_0$ | $l_0,7$ | $l_0,7$ | $l_0,7$ | - | - | | |
| 10 | $l_0$ | $l_0,9$ | $l_0,6,9$ | $l_0,6,9$ | - | - | | |
| 11 | $l_0$ | $l_0,9$ | $l_0,6,9$ | $l_0,6,9$ | - | - | | |
| 12 | $l_0$ | $l_0,9$ | $l_0,6,9$ | $l_0,5,8,11$ | - | - | | |
| 13 | $l_0$ | $l_0,11$ | $l_0,7,11$ | $l_0,5,8,11$ | - | - | | |
| 14 | $l_0$ | $l_0,11$ | $l_0,7,11$ | $l_0,5,8,11$ | - | - | | |

| PDSCH Symbol | DMRS Type 1 Configuration ||||  DMRS Type 2 Configuration ||||
|---|---|---|---|---|---|---|---|---|
| | Additional Position 0 | Additional Position 1 | Additional Position 2 | Additional Position 3 | Additional Position 0 | Additional Position 1 | Additional Position 2 | Additional Position 3 |
| 0 | 0.95 | 0.92 | 0.89 | 0.85 | 0.97 | 0.95 | 0.92 | 0.9 |
| 1 | 0.89 | 0.85 | 0.82 | 0.78 | 0.9 | 0.88 | 0.855 | 0.83 |
| 2 | 0.82 | 0.78 | 0.75 | 0.71 | 0.83 | 0.8 | 0.78 | 0.76 |
| 3 | 0.75 | 0.71 | 0.67 | 0.64 | 0.76 | 0.73 | 0.71 | 0.69 |

B

| PDSCH mapping type | Normal cyclic prefix ||| Extended cyclic prefix |||
|---|---|---|---|---|---|---|
| | S | L | S+L | S | L | S+L |
| Type A | {0, 1, 2, 3} [Note 1] | {3,...,14} | {3,...,14} | {0, 1, 2, 3} [Note 1] | {3,...,12} | {3,...,12} |
| Type B | {0,...,12} | {2, 4, 7} | {2,...,14} | {0,...,10} | {2, 4, 6} | {2,...,12} |
| Note 1: S = 3 is applicable only if dmrs-TypeA-Position = 3 ||||||||

| PDCCH symbols used | Current used values | | | | Addition DRMS added | | | | Addition DRMS added | | | Proposed approach Final Decision | Gain | |
|---|---|---|---|---|---|---|---|---|---|---|---|---|---|---|
| | DMRS Positions | Code Rate efficiency | MCS index | Spectral efficiency | Net efficiency per symbol (# bits per symbol) | DMRS Positions | Code Rate efficiency | Net efficiency per symbol (# bits per symbol) | MCS Index | Spectral efficiency | Net efficiency per symbol (# bits per symbol) | | Code Rate | Percentage |
| 1 | Additional Pos 0 | 0.890 | 3 | 0.877 | 0.78053 | Additional Pos 1 | 0.850 | 0.74545 | 2 | 0.8016 | 0.535424 | RS density update | 0.210026 | 26.91 |
| 1 | Additional Pos 0 | 0.890 | 10 | 2.5703 | 2.287567 | Additional Pos 1 | 0.850 | 2.184755 | 8 | 2.1602 | 1.922578 | RS density update | 0.262177 | 11.46 |
| 1 | Additional Pos 0 | 0.890 | 20 | 5.332 | 4.74548 | Additional Pos 2 | 0.820 | 4.37224 | 19 | 5.1152 | 4.552528 | MCS Update | 0.180288 | 3.80 |
| 1 | Additional Pos 0 | 0.890 | 26 | 7.1602 | 6.372578 | Additional Pos 2 | 0.820 | 5.871364 | 25 | 6.9141 | 6.153549 | MCS Update | 0.282185 | 4.43 |
| 1 | Additional Pos 1 | 0.850 | 5 | 1.4766 | 1.25511 | Additional Pos 2 | 0.820 | 1.210812 | 3 | 0.877 | 0.74545 | RS density update | 0.465362 | 37.08 |
| 1 | Additional Pos 1 | 0.850 | 10 | 2.5703 | 2.184755 | Additional Pos 2 | 0.820 | 2.107646 | 12 | 3.0293 | 2.574905 | MCS Update | 0.467259 | 21.39 |
| 1 | Additional Pos 1 | 0.850 | 15 | 3.9023 | 3.316855 | Additional Pos 3 | 0.780 | 3.043794 | 10 | 2.5703 | 2.184755 | RS density update | 0.859039 | 25.90 |
| 1 | Additional Pos 2 | 0.750 | 5 | 1.4766 | 1.10745 | Additional Pos 3 | 0.710 | 1.048386 | 4 | 1.1758 | 0.88185 | RS density update | 0.166536 | 15.04 |
| 1 | Additional Pos 2 | 0.750 | 10 | 2.5703 | 1.927725 | Additional Pos 3 | 0.710 | 1.824913 | 8 | 2.1602 | 1.62015 | MCS Update | 0.204763 | 10.62 |
| 1 | Additional Pos 2 | 0.750 | 20 | 5.332 | 3.999 | Additional Pos 3 | 0.710 | 3.78572 | 15 | 3.9023 | 2.926725 | RS density update | 0.858995 | 21.88 |
| 1 | Additional Pos 2 | 0.750 | 25 | 6.9141 | 5.185575 | Additional Pos 3 | 0.710 | 4.909011 | 22 | 5.8906 | 4.41795 | RS density update | 0.491061 | 9.47 |

METHOD AND APPARATUS FOR IMPROVING A THROUGHPUT FOR A USER EQUIPMENT IN A WIRELESS NETWORK SYSTEM

CROSS-REFERENCE TO RELATED APPLICATION(S)

This application is a continuation application, claiming priority under § 365(c), of an International application No. PCT/KR2021/014353, filed on Oct. 15, 2021, which is based on and claims the benefit of Indian provisional patent application number 202041045006, filed on Oct. 15, 2020, in the Indian Intellectual Property Office, and of an Indian Complete patent application number 202041045006, filed on Oct. 8, 2021, in the Indian Intellectual Property Office, the disclosure of each of which is incorporated by reference herein in its entirety.

FIELD OF THE INVENTION

The disclosure relates to mobile communication. More particularly, the disclosure relates to method and system for 5th Generation (5G) New Radio (NR) based gNodeBs (gNBs) under multiple Connected User Equipment (UE) scenarios in a fast-fading environment in order to get better channel estimates at the UE side for throughput improvement by reducing packet decoding failure.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The emerging 5th generation (5G) networks provide services to diversified applications with different requirements. 5G New Radio (5G NR) systems are designed to cover a variety of use case scenarios including massive Machine Type Communications (mMTC), ultra-Reliable Low Latency Communications (uRLLC), and enhanced Mobile Broadband (eMBB). The purpose of mMTC is to provide connectivity to a large number of low-power devices in a massive quantity with low to moderate data rate transmission. eMBB focuses on higher data rate mobile applications with enormous data connectivity for a prolonged duration. uRLLC is for high reliable low latency communications with medium data rate applications like Industrial automation, Machine critical applications, etc. To support a variety of applications in a radio access technology is quite challenging and requires a lot of modification to the current system design.

The 3rd Generation Partnership Project (3GPP) defined specifications for the 5G NR system to meet the various such requirements with different system configurations. Typically, in order to achieve multi-Gbps requirements, the 5G NR system is likely to operate in larger bandwidth at higher frequency bands particularly in the millimeter wave (mmW) range. In addition, massive Multi-Input Multi-Output (MIMO) with Beamforming antenna technology delivers big benefits to operators and end-users like improved spectral efficiency, reduced interference, extended range, etc. Channel models in mmW range are completely different than channel models due to various characteristics of the related art. Commonly used channel models may not be suitable to model channel parameters in the mmW frequency range due to not considering spatial consistency where transient motion or closely spaced users need to be accounted. To carry out system level and link-level simulations in mmW band, 3GPP proposed channel models for the scenarios which include urban microcell street canyon, urban macrocell, indoor office, and the rural macrocell. Among various possible channel models, the design of reference symbol pattern for 5G NR systems operating in mmW band is quite challenging to accurately estimate the channel parameters at the UE side, to improve thereby throughput at the UE side.

Various efforts have been made to solve the technical problem discussed above. For example, US20180278390A1 titled "Base station apparatus, terminal apparatus, and communication method" discloses a method for configuring multiple channel state information reference signal (CSI-RS) for a UE. The gNB then sends each CSI-RS with a different precoding pattern. Based on the channel quality indicator (CQI) received from the UE for each of the configured CSI-RS, the gNB may choose for data transmission, precoding pattern corresponding to the CSI-RS configuration for which the highest CQI is received. Similarly, US20160254893A1 titled "Method for configuring channel state information reference signal, and base station" discloses a method based on a UE location, it is determined that the UE is in a cross-coverage area of more than one cell. In this scenario, the UE is configured with multiple CSI-RS ports corresponding to each of the overlapped cells respective.

As illustrated, the selection of reference Signal pattern in FIG. 6 according to the related art, the transmission of physical downlink shared channel (PDSCH)/physical uplink shared channel (PUSCH) data can occur in all 14 symbols in resource block (RB) 600. demodulation reference signal (DMRS) symbols are transmitted in each RB allocated to the UE. Irrespective of the number of DMRS that are used for transmission, there will always be a few symbols that may suffer from poor estimation. Moreover, DMRS symbols are not transmitted in all the subcarriers. It is transmitted in an interleaved fashion with 50% or 33% occupation in an RB. This may limit the accuracy of channel estimates especially in a fast fading channel environment, which will lead to degradation in throughput. More reference symbols lead to degradation in instantaneous throughput. At the same time, better channel estimation leads to lower NACKSs (lower Block Error Rate (BLER)) and higher average throughput. Hence, there is a need for a method to improve the cell and per UE throughput based on additional reference signal configurations.

Further, as illustrated, modulation and coding scheme (MCS) Adaptation Vs Additional Reference Symbols, in FIG. 7 according to the related art, there are two approaches considered to improve the error rate at the UE side. Incorporating additional reference symbols at the UE side for better channel estimation and coherent detection as illustrated in RB 700. Reducing the MCS levels for the robust detection of the data symbols. Both approaches will impact the transmission code rates. As per 3GPP specifications, it is an open item to select any one approach for better reception of data symbols. Hence, an optimal selection of approaches with a high data transmission code rate is desired.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide to introduce a selection of concepts, in a simplified format, that are further described in the detailed description of the disclosure. This summary is neither intended to identify key or essential inventive concepts of the disclosure and nor is it intended for determining the scope of the disclosure.

Additional aspects will be set forth in part in the description which follows and, in part, will be apparent from the description, or may be learned by practice of the presented embodiments.

In accordance with an aspect of the disclosure, a method for improving throughput for User Equipment (UE) performed by a Base Station (BS) in a wireless communication network is provided. The method includes detecting a channel condition of a connection between the UE and the BS to be fast fading. The method further includes updating a modulating scheme of the connection in response to the detection that the channel condition is fast fading, and estimating a first throughput of the connection. The estimation of the first throughput is based the updated modulating scheme. The method includes identifying a need to modify the connection by increasing or decreasing at least one Reference Signal associated with the connection and calculating a second throughput for the modified connection. The method includes comparing the first throughput with the second throughput. The method includes modifying the connection by increasing or decreasing at least one Reference Signal when the second throughput is more than the first throughput.

In accordance with another aspect of the disclosure, a method of improving throughput for a User Equipment (UE) performed by a Base Station (BS) in a wireless communication network is provided. The method includes detecting a channel condition of a connection between the UE and the BS to be fast fading. The method further includes dynamically selecting between link adaptation and reference signal count adjustment transmission schemes. The dynamically selecting between link adaptation and reference signal count adjustment transmission schemes includes obtaining an effective code rate achieved by the link adaptation and reference signal count adjustment transmission schemes, respectively, and selecting one of the link adaptation and reference signal count adjustment transmission schemes, based on the highest of the obtained effective code rate. The method further includes selecting the transmission scheme for the UE based on the selection between the link adaptation and the reference signal count adjustment transmission schemes.

In accordance with another aspect of the disclosure, a method of improving the throughput for User Equipment, UE, by a Base Station, BS, in a wireless communication network is provided. The method includes detecting a channel condition of a connection between the UE and the BS to be fast fading. The method further includes dynamically estimating an optimal number of DMRS symbols based on at least one of the number of physical downlink shared channel (PDSCH)/physical uplink shared channel (PUSCH) symbols used over a medium-term, and the difference between an observed Block Error Rate (BLER), and target BLER. The method further includes selecting a transmission scheme for the UE based on said estimation.

In accordance with another aspect of the disclosure, a method of improving the throughput for User Equipment, UE, by a Base Station, BS, in a wireless communication network is provided. The method includes detecting a channel condition of a connection between the UE and the BS to be fast fading. The method further includes dynamically selecting CSI-RS in addition to DMRS based on at least one of a medium-term PDSCH/PUSCH usage, and a difference between observed Block Error Rate, BLER, and target BLER. The method further includes selecting a transmission scheme for UE based on said selection.

In accordance with another aspect of the disclosure, a method of improving the throughput for User Equipment, UE, by a Base Station, BS, in a wireless communication network, based on artificial intelligence techniques are disclosed. The method includes detecting a channel condition of a connection between the UE and the BS to be fast fading. The method further includes predicting a reference symbol pattern based on an artificial neural network, estimating the number of DMRS/CSI-RS symbols to be added or removed, and selecting one of the Link Adaptation and the reference signal adaptation transmission schemes, wherein the estimating and selecting are based on at least one of medium-term PDSCH/PUSCH Symbol usage, observed Block Error Rate, BLER, target BLER, UE mobility, CQI, SINR and stored past output data. The method further includes selecting a transmission scheme for UE based on said prediction.

In accordance with another aspect of the disclosure, a system for improving throughput for User Equipment, UE, by a Base Station, BS, in a wireless communication network is provided. The system includes a memory and a processor coupled to the memory. The processor is configured to detect a channel condition of a connection between the UE and the BS to be fast fading. The processor is further configured to update a modulating scheme of the connection in response to the detection, and estimate a first throughput of the connection. The estimation of the first throughput is based the updated modulating scheme. The processor is further configured to identify a need to modify the connection by increasing or decreasing at least one Reference Signals from the connection and calculating a second throughput for the modified connection. The processor is further configured to compare the first throughput with the second throughput. The processor is further configured to modify the connection by increasing or decreasing at least one Reference Signal if the second throughput is more than the first throughput.

In accordance with another aspect of the disclosure, a system for improving the throughput for User Equipment, UE, by a Base Station, BS, in a wireless communication network is provided. The system includes a memory and a processor coupled to the memory. The processor is configured to detect a channel condition of a connection between the UE and the BS to be fast fading. The processor is further configured to dynamically select between link adaptation and reference signal count adjustment transmission schemes. The dynamically selecting between link adaptation and reference signal count adjustment transmission schemes includes obtaining an effective code rate achieved by the link adaptation and reference signal count adjustment transmission schemes, respectively, and selecting one of the link adaptation and reference signal count adjustment transmission schemes, based on the highest of the obtained effective code rate. The processor is further configured to select the transmission scheme for the UE based on said selection.

In accordance with another aspect of the disclosure, a system for improving the throughput for User Equipment, UE, by a Base Station, BS, in a wireless communication network is provided. The system includes a memory and a processor coupled to the memory. The processor is configured to detect a channel condition of a connection between the UE and the BS to be fast fading. The processor is further configured to dynamically estimate an optimal number of DMRS symbols based on at least one of the number of PDSCH/PUSCH symbols used over a medium-term, and the difference between an observed Block Error Rate BLER, and target BLER. The processor is further configured to select a transmission scheme for the UE based on said estimation.

In accordance with another aspect of the disclosure, a system for improving the throughput for User Equipment, UE, by a Base Station, BS, in a wireless communication network is provided. The system includes a memory and a processor coupled to the memory. The processor is configured to detect a channel condition of a connection between the UE and the BS to be fast fading. The processor is further configured to dynamically select CSI-RS in addition to DMRS based on at least one of a medium-term PDSCH/PUSCH usage, and a difference between observed Block Error Rate, BLER, and target BLER. The processor is further configured to select a transmission scheme for UE based on said selection.

In accordance with another aspect of the disclosure, a system for improving the throughput for User Equipment, UE, by a Base Station, BS, in a wireless communication network, based on artificial intelligence techniques are provided. The system includes a memory and a processor coupled to the memory. The processor is configured to detect a channel condition of a connection between the UE and the BS to be fast fading. The processor is further configured to predict a reference symbol pattern based on an artificial neural network, estimate the number of DMRS/CSI-RS symbols to be added or removed, and select one of the Link Adaptation and the reference signal adaptation transmission schemes, wherein the estimating and selecting are based on at least one of medium-term PDSCH/PUSCH Symbol usage, observed Block Error Rate, BLER, target BLER, UE mobility, CQI, SINR and stored past output data. The processor is further configured to select a transmission scheme for UE based on said prediction.

Other aspects, advantages and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1A illustrates a table for DMRS position according to a PDSCH mapping type and duration in symbols, according to the related art;

FIG. 3 illustrates code rate variations for DMRS symbol transmission and 5G NR PDSCH Transmission, according to the related art;

FIG. 14 illustrates the estimates for the choice between RS density adjustment and Link Adaptation based on effective rate calculation, according to an embodiment of the disclosure;

Figure 1B:
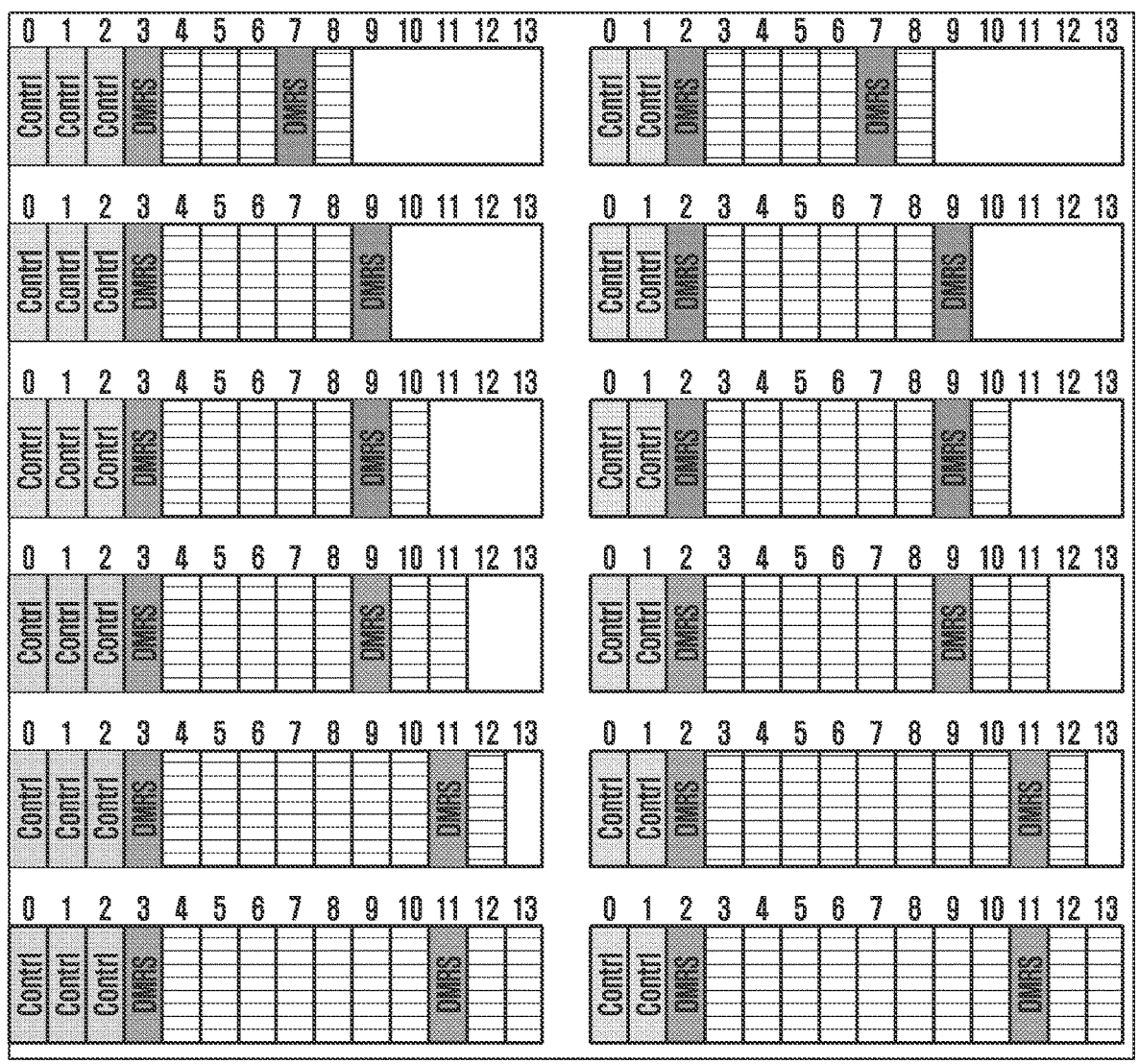
FIG. 1B illustrates DMRS in PDSCH transmission, in particular, DMRS signal positions in a slot, according to the related art.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by symbols, of the related art, and the drawings may show only those specific details that are pertinent to understanding the embodiments of the disclosure so as not to obscure the drawings with details that will be readily apparent to those of ordinary skill in the art having the benefit of the description herein.

Throughout the drawings, like reference numerals will be understood to refer to like parts, components, and structures.

DETAILED DESCRIPTION OF FIGURES

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For example, the term "some" as used herein may be understood as "none" or "one" or "more than one" or "all." Therefore, the terms "none," "one," "more than one," "more than one, but not all" or "all" would fall under the definition of "some." It should be appreciated by a person skilled in the art that the terminology and structure employed herein is for describing, teaching and illuminating some embodiments and their specific features and elements and therefore, should not be construed to limit, restrict or reduce the spirit and scope of the claims or their equivalents in any way.

For example, any terms used herein such as, "includes," "comprises," "has," "consists," and similar grammatical variants do not specify an exact limitation or restriction, and certainly do not exclude the possible addition of one or more features or elements, unless otherwise stated. Further, such terms must not be taken to exclude the possible removal of one or more of the listed features and elements, unless otherwise stated, for example, by using the limiting language including, but not limited to, "must comprise" or "needs to include."

Whether or not a certain feature or element was limited to being used only once, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language including, but not limited to, "there needs to be one or more . . . " or "one or more element is required."

Unless otherwise defined, all terms and especially any technical and/or scientific terms, used herein may be taken to have the same meaning as commonly understood by a person ordinarily skilled in the art.

Reference is made herein to some "embodiments." It should be understood that an embodiment is an example of a possible implementation of any features and/or elements presented in the attached claims. Some embodiments have been described for the purpose of explaining one or more of the potential ways in which the specific features and/or elements of the attached claims fulfil the requirements of uniqueness, utility, and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or other variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or in the context of more than one embodiment, or in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not necessarily be taken as limiting factors to the attached claims. The attached claims and their legal equivalents can be realized in the context of embodiments other than the ones used as illustrative examples in the description below.

For the sake of better understanding, one or more mathematical formulas/equations/symbols are included in the disclosure, for validating the disclosure disclosed in the disclosure. These formulas/equations/symbols should not be construed as limiting features/concepts to the disclosure. These merely relate to the experimental data of the disclosure.

5G New Radio (NR) is a new wireless access technology which is developed by the 3rd Generation Partnership Project (3GPP) to meet the diverse performance requirements by various use cases. In addition, the 5G NR system is set to provide seamless end-to-end connectivity for a large number of connected devices in high mobility scenarios. 5G NR system is designed to support larger bandwidth in order to meet the high data rate requirements. A solution to estimate the channel response across the configured Bandwidth Part (BWP) is a challenging task due to a variety of system configurations and diverse channel conditions at a higher frequency of operation. The channel estimation techniques have not deeply analyzed the performance and selection of 5G NR pilot patterns. The disclosure relates to the design of the 5G NR Demodulation Reference Signal (DMRS) based pilot pattern for maximizing the channel capacity by considering different channel models. The choice of usage of Modulation and Coding Scheme (MCS) adaptation against additional reference symbol transmission has been evaluated for a higher code rate transmission. 5G NR standard oriented framework is proposed to dynamically adjust the DMRS pattern as per target Block Error Rate (BLER) and feedback response. The trade-off between channel estimation accuracy and DMRS overhead is considered while designing the pilot pattern. It is observed from simulation results provided in the later section of this disclosure that, a significant gain in throughput is achieved by the proposed scheme under specific traffic and channel conditions as compared to schemes of the related art.

Unlike in 4G systems, separate reference signal patterns are introduced in 5G NR for various system requirements like Cell Search, beamforming, Data demodulation, etc. In addition, there is an option to vary the density of reference symbols in a slot based on predefined configurations. The disclosure can be used in Fifth Generation (5G) New Radio (NR) based gNBs under multiple connected User Equipment (UE) scenario in a fast-fading environment in order to get better channel estimates at the UE side for throughput improvement by reducing packet decoding failure. The disclosure improves the channel estimation and thereby throughput at the UE side. The DMRS and CSI-RS pattern can be adaptively varied as per the PDSCH/PUSCH symbol usage, target and observed BLER, CQI, and more parameters. The accurate channel estimation can be obtained using the exact position of DMRS and CSI-RS symbols in particular REs where interpolation accuracy is minimal in a fast-fading environment. The disclosure significantly increases the Cell throughput and flexibility in the CSI-RS/DMRS configurations at the gNB.

Further, it is possible to transmit the PDSCH/PUSCH data in all 14 symbols in an RB. DMRS symbols are transmitted in each RB allocated to the UE. Irrespective of the number of DMRS that are used for transmission, there will always be a few symbols that may suffer from poor estimation. Moreover, DMRS symbols are not transmitted in all the subcarriers. It is transmitted in an interleaved fashion with 50% or 33% occupation in an RB. This may limit the accuracy of channel estimates especially in a fast fading channel environment, which will lead to degradation in throughput. More reference symbols lead to degradation in instantaneous throughput. At the same time, better channel estimation leads to lower NACKSs (lower BLER) and higher average throughput Hence there is a tradeoff between throughput and channel estimation accuracy. The method of the disclosure improves the cell and per UE throughput based on additional reference signal configurations.

Fast fading environment for a UE can be identified based on (a) High Speed based UE based on Doppler estimate, (b) High rate of change of UL SINR, or (c) High rate of change of DL CQI.

According to an aspect of the disclosure, the trigger Criterion for estimation of the number of reference symbols is described. The functionality to estimate the required number of DMRS and CSI-RS reference symbols will be triggered at the following events:

Receipt of DL CQI/UL SINR

Configurable number of PDSCH transmissions and HARQ ACK/NACK within a given period Configurable number of PUSCH transmissions and HARQ ACK/NACK within a given period According to a further aspect of the disclosure, the decision-making Criterion for estimation of the number of reference symbols is described. Observed BLER calculation:

Actual BLER measured using a sliding window of ACK/NACKS over a configured time interval Min number of samples within the time period needed for decision making PDSCH/PUSCH Symbol Usage:

IIR Filtered Based Mechanism $$\text{Filtered Symbol Usage} = \alpha(\text{Average Symbols in current period}) + (1-\alpha)*\text{Previous Filtered Average sysmbols}$$

Additional DMRS/CSI-RS symbols will be included in a slot if the Average number of PDSCH/PUSCH symbols is greater than the respective configured threshold. As illustrated in B of FIG. 3, the above table presents that the election of Mapping Type A and B is part of time-domain resource allocation. For PDSCH Mapping Type A, the first symbol used by DMRS can be either symbol 2 or 3 of the slot. For PDSCH Mapping Type B, the first symbol used by DMRS is always the first symbol of resource allocation. DMRS symbols are allocated across the PDSCH allocation. The max number of symbols allocated to DMRS is four.

In 5G NR systems, there is an option to increase or decrease the density of DMRS symbols for better channel estimation while transmission. Channel State Information Reference Signals (CSI-RS) are transmitted periodically in Downlink. CSI-RS resource symbols are sent to each UE via RRC configuration (Periodicity, Frequency (subcarrier frequency within an RB), and Time locations (symbol within an RB)). The specs allow CSI-RS to be configured separately for each UE. CSI-RS REs are allocated across the entire BW in each RB at the defined periodicity.

The key purpose of DMRS is to estimate the channel for the coherent detection of data symbols. 5G NR standard allows configuring the user-specific DMRS pattern based on the use case scenario instead of having a common reference signal pattern. The density of the reference signal should be carefully determined in both frequency and time domain as per the channel characteristics. For example, additional DMRS symbols are to be transmitted for fast time-varying channels under high mobility scenario in order to have at least one DMRS symbol within the channel coherence time. Similarly, for a high delay spread channel having sharper coherence bandwidth, the density of the DMRS signal needs to be maintained high in the frequency domain to capture the channel characteristics completely for perfect channel estimation. There is always a trade-off between channel estimation accuracy and DMRS overhead. Hence allocation with a proper density of DMRS is required for throughput maximization.

Embodiments of the disclosure will be described below in detail with reference to the accompanying drawings.

Demodulation Reference Signals, DMRS, are used by 5G NR receivers for channel estimation to demodulate the associated physical channel DMRS is transmitted following 5G Channels:

PBCH—Physical Broadcast Channel
PDCCH—Physical Downlink Control Channel
PDSCH—Physical Downlink Shared Channel
PUSCH—Physical Uplink Shared Channel
PUCCH—Physical Uplink Control Channel The design and mapping of DMRS are specific to associated channels. DMRS sequence is QPSK modulated based on Gold sequences. Additional DMRS can be configured through RRC signaling. DMRS can be configured specifically to each UE. The basic DMRS pattern is front-loaded (at least a Single symbol) and an Addition of DMRS symbols based on use case scenarios.

FIGS. 1A and 1B illustrate DMRS in PDSCH transmission, in particular, table 100 illustrates a correlation between a duration in symbols and DMRS positions. Table 100A illustrates DMRS signal positions in a slot, according to the related art. The maximum number of symbols allocated to DMRS is four and the minimum is 1. $l_0$—is the position of the first DMRS. An increase or decrease of DMRS signal density is not defined. Change in DMRS density is informed to specific UE based on RRC signaling.

Figure 2:
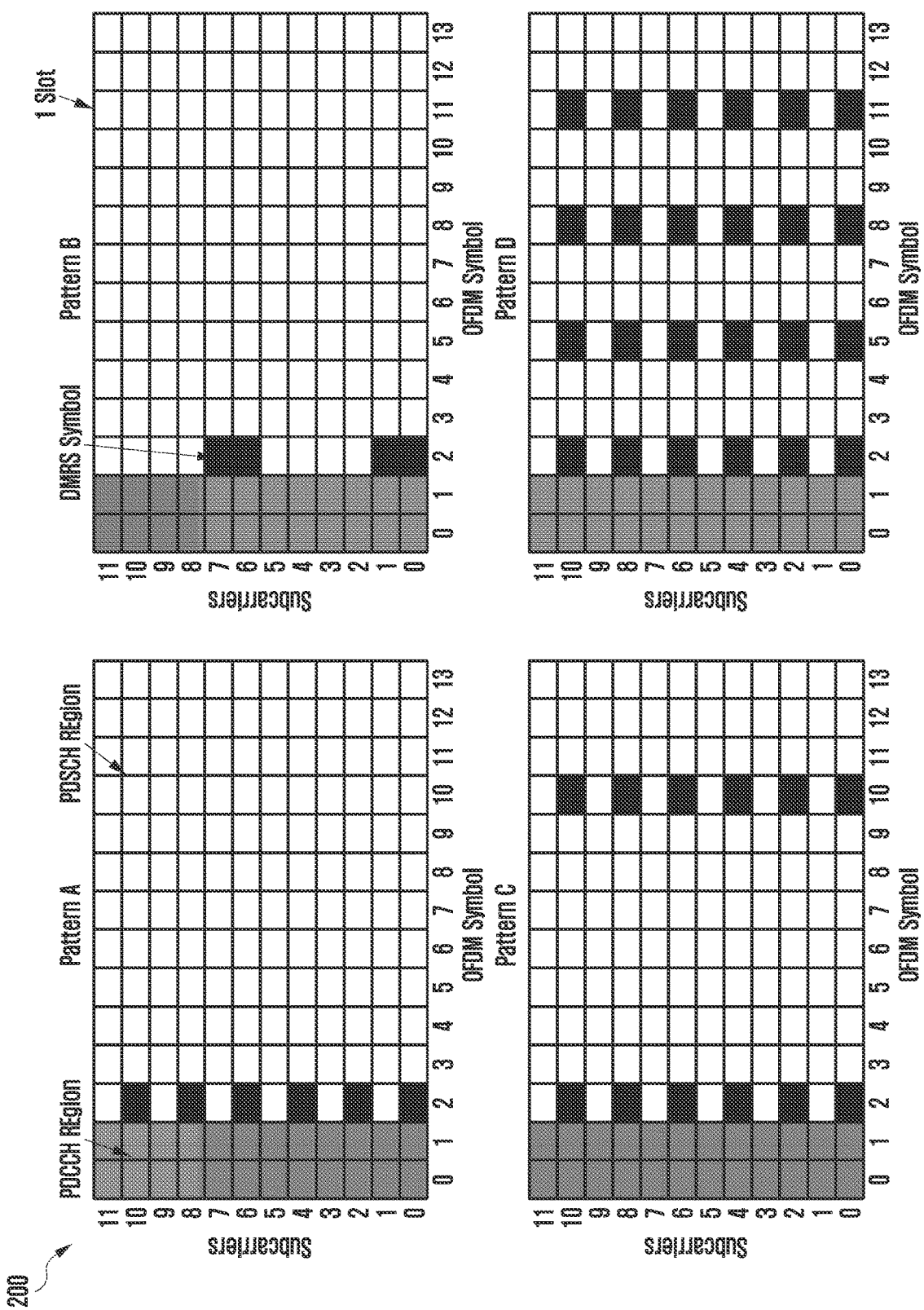
FIG. 2 illustrates a set of DMRS patterns with Different Densities or use case scenarios of DMRS in PDSCH transmission, according to the related art.

FIG. 2 illustrates a set of DMRS patterns with Different Densities or use case scenarios of DMRS in PDSCH transmission, according to the related art. As illustrated, 'Pattern A' is defined as DMRS Type 1, Pos. 2, Add1. Pos. 0, Max Len-1, for slow time-varying channels. 'Pattern B' is defined as DMRS Type 2, Pos. 2, Add2. Pos. 0, Max Len-1, for Frequency-Selective Channels. 'Pattern C' is defined as DMRS Type 1, Pos. 2, Add1. Pos. 2, Max Len-1, for fast time-varying channels. 'Pattern D' is defined as DMRS Type 1, Pos. 2, Add1. Pos. 3, Max Len-1, for frequency and time selective channels.

For stationary channel conditions, uniform distribution of DMRS across time and frequency in a resource grid is preferred to minimize the interpolation error. Numerous varieties of DMRS patterns are introduced in 5G NR systems which can be selected based on the number of control symbols (PDCCH) and data symbols within a slot. DMRS Type 1 and Type 2 patterns with single and double symbol lengths are defined and up to 3 more additional positions can be added based on the length of PDSCH symbols. The location of the DMRS in the frequency axis can be varied based on the cell ID and antenna port.

According to an aspect of the disclosure, the configuration of DMRS and CSI—Reference symbols for UE based on RRC signaling is already given in 3GPP specifications. UE uses DMRS for channel estimation and CSI-RS for SINR/CQI estimation. Increasing the number of reference symbols will impact throughput. At the same time, better channel estimation leads to lower NACKs (Lower BLER) and higher throughput. Lower BLER at UE can be improved also by reducing MCS using link adaptation.

FIG. 3 illustrates code rate variations for DMRS symbol transmission, according to the related art.

Code rate calculation by incorporating additional DMRS symbols for DMRS Type 1 and Type 2 configuration is provided in the table illustrated in A of FIG. 3. The code rate is also affected by adding more PDCCH symbols. It can be seen that the data transmission code rate decrease significantly when more DMRS symbols (Additional Position 3) are introduced in the system. Hence, the optimal selection of DMRS additional positions is necessary to increase the cell and per UE throughput.

Figure 4:
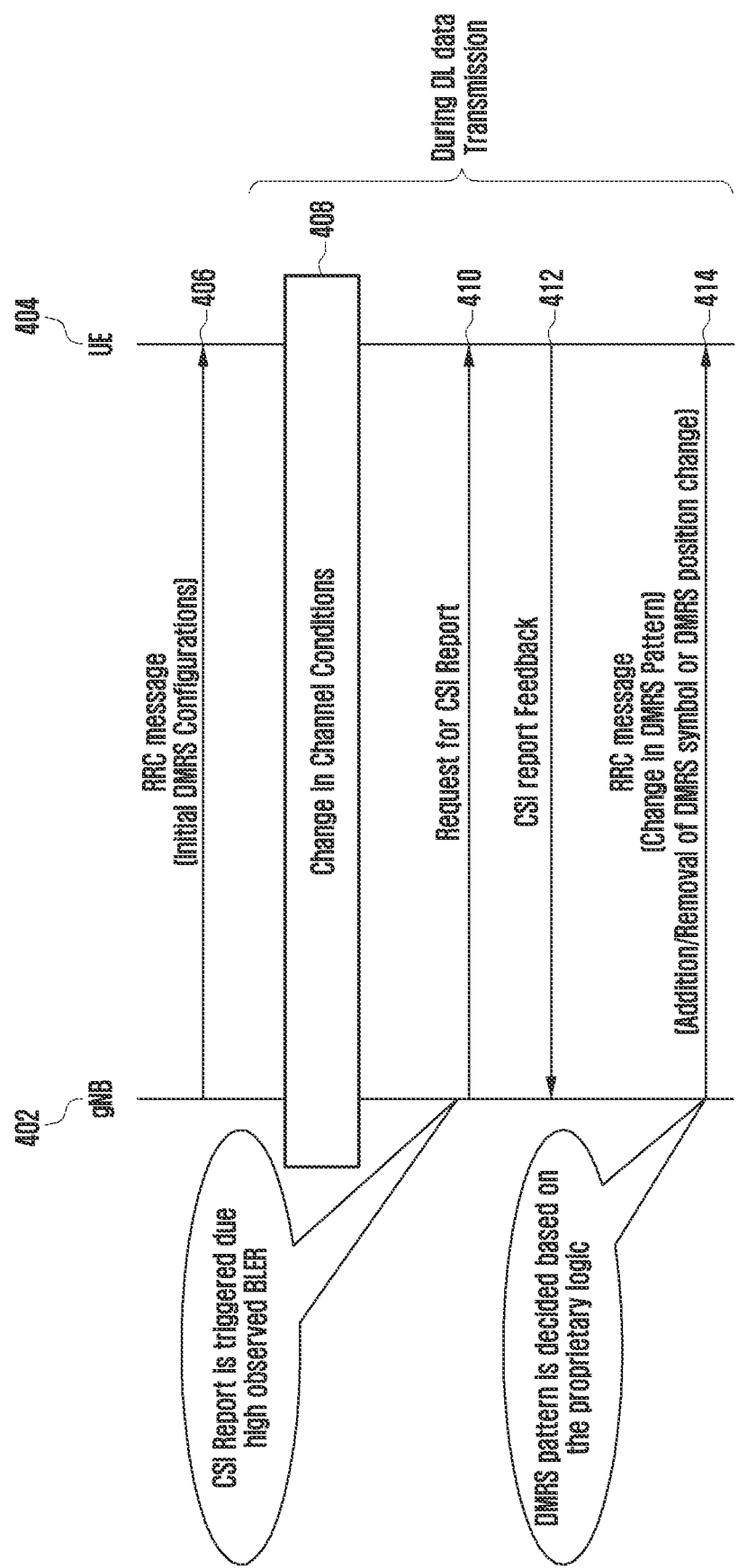
FIG. 4 illustrates DMRS Pattern change through RRC signaling, according to the related art.

FIG. 4 illustrates DMRS Pattern change through RRC signaling, according to the related art.

Referring to FIG. 4, at operation 406, an RRC message from gNB 402 for initial DMRS configuration is sent to a UE 404. At operation 408, during download data transmission, a change in channel conditions is detected. At operation 410, a request for a CSI report triggered due to high observed BLER is requested by the gNB 402 from the UE 404. At operation 412, CSI report feedback is provided by the UE 404 to the gNB 402. At operation 414, a change in DMRS pattern decided based on the predetermined logic in an RRC message to add/remove DMRS symbol or DMRS position change is communicated to the UE 404 by the gNB 402.

Channel State Information Reference Signal (CSI-RS) is used by a UE to estimate the channel and report the channel quality information to the base station during mobility and beam management. CSI-RS is also used for frequency/time tracking, demodulation, and UL reciprocity-based pre-coding. CSI-RS resource symbols are sent to each UE via RRC configuration (Periodicity, Frequency (subcarrier frequency within an RB), and Time locations (symbol within an RB)). The specifications allow CSI-RS to be configured separately for each UE. CSI-RS REs are allocated across the entire BW in each RB at the defined periodicity. Multiple UEs can share the CSI-RS REs through the code domain. 5G NR standard allows a high level of flexibility in CSI-RS configurations, a resource can be configured with up to 32 ports. CSI-RS resource may start at any OFDM symbol in a slot. CSI-RS occupies 1/2/4 OFDM symbols depending upon a configured number of ports. CSI-RS can be triggered periodic, semi-persistent, or aperiodic (due to DCI triggering). CSI report is independent of CSI-RS reference signal transmission. For time/frequency tracking, CSI-RS can either be periodic or aperiodic. It is transmitted in bursts of two or four symbols which are spread across one or two slots.

Figure 5:
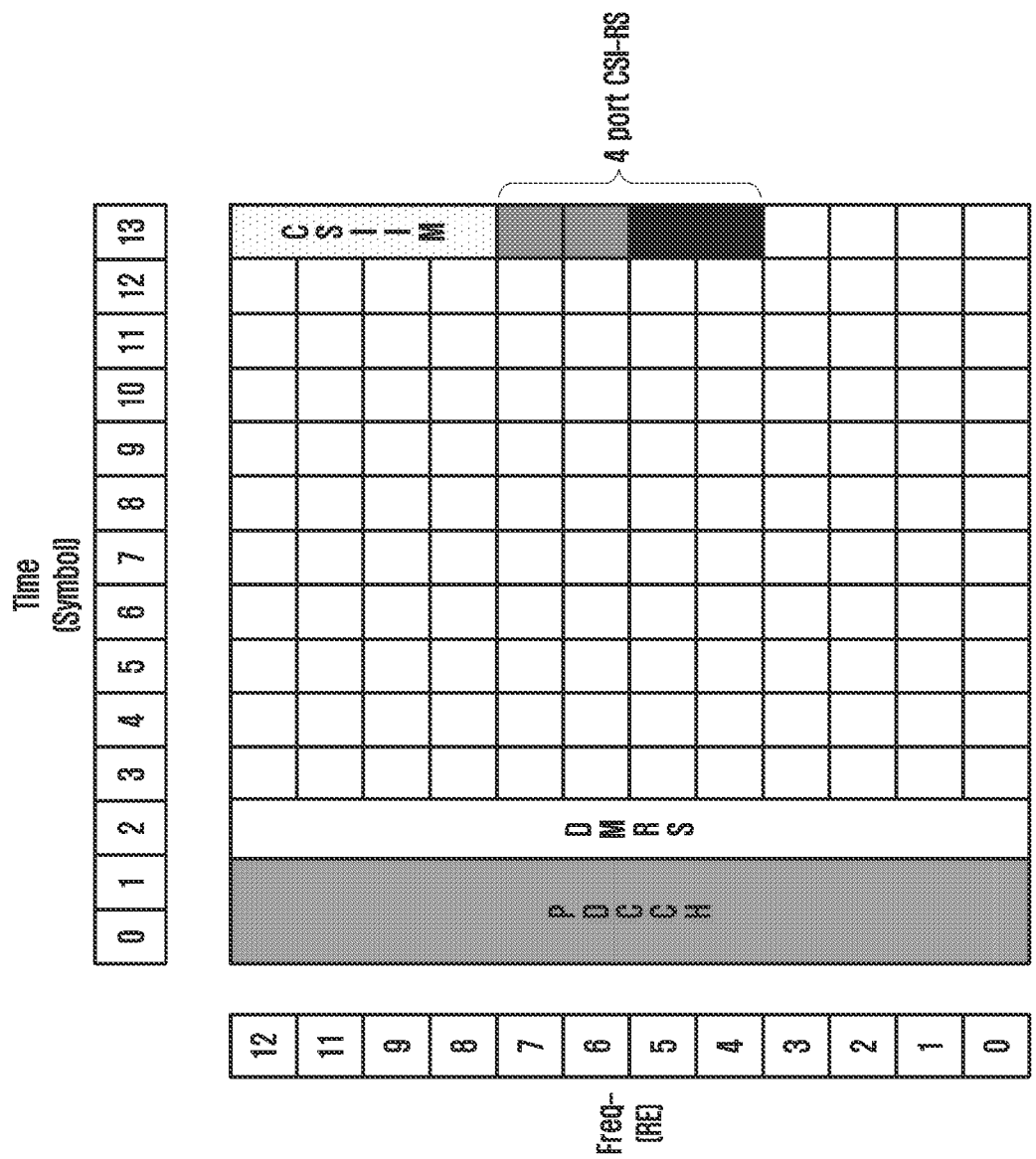
FIG. 5 illustrates CSI-RS transmission in a slot, according to the related art.
Figure 6:
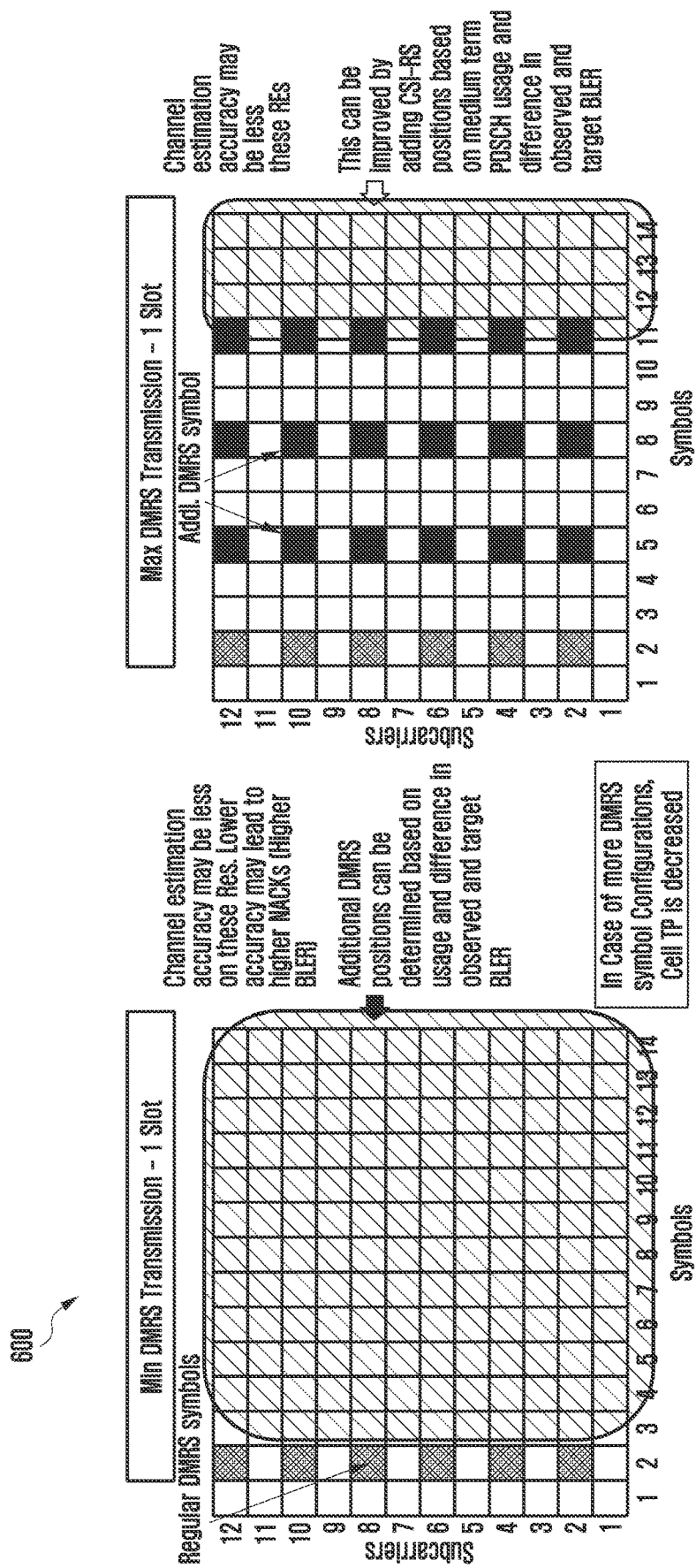
FIG. 6 illustrates the selection of reference Signal patterns, according to the related art.
Figure 7:
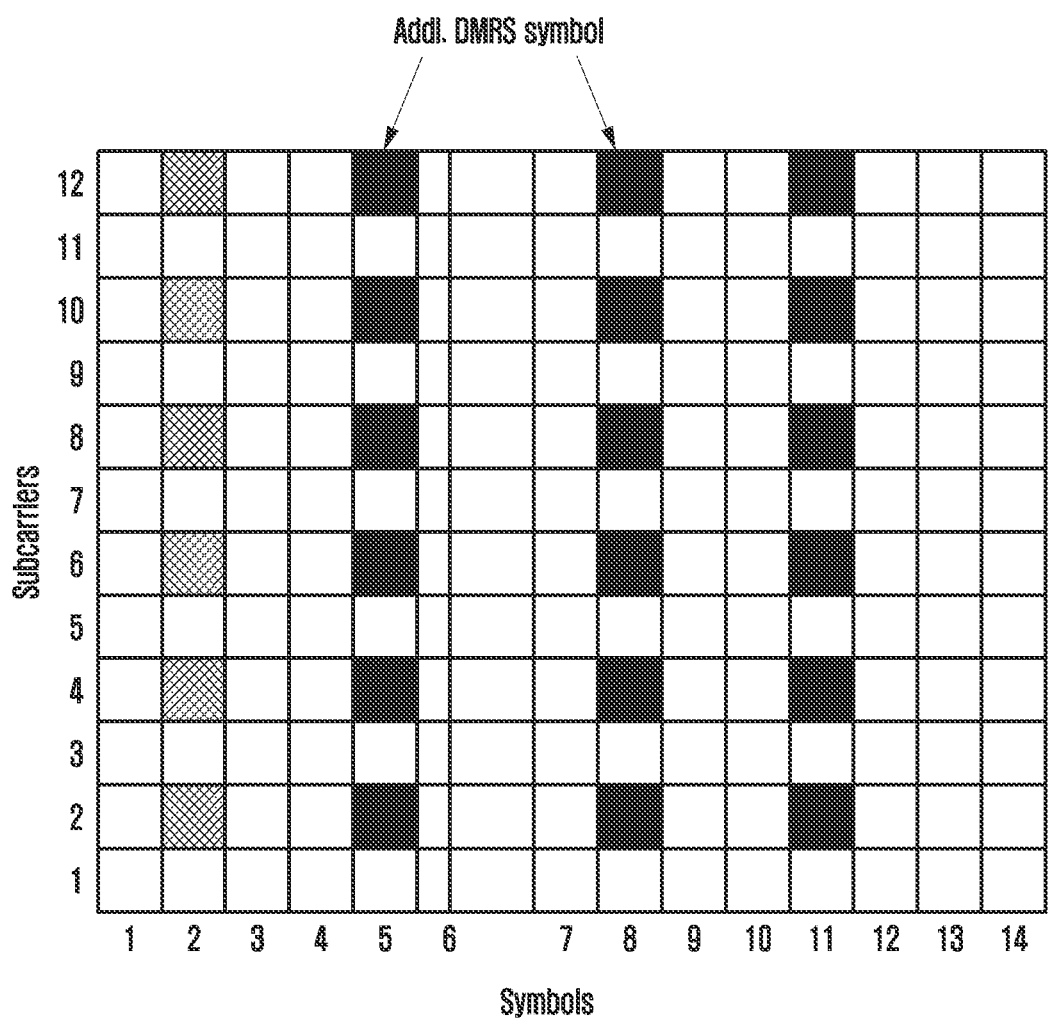
FIG. 7 illustrates MCS Adaptation Vs Additional Reference Symbols, according to the related art.

FIG. 5 illustrates CSI-RS transmission in a slot, according to the related art.

Referring to FIG. 5, resource block 500 includes non-zero power CSI-RS symbols can be transmitted as per the RRC Configuration. Periodicity, Frequency, and Time Locations of a CSI-RS symbol can be configured through RRC configuration. CSI-RS Symbols can be configured anywhere in the Slot. It can be seen that CSI-RS is configured in the last symbol of the slot.

Referring to B in FIG. 3, in 5G NR systems, Physical Downlink Shared Channel (PDSCH) symbol mapping can be done in two types. Type A and Type B allocation. For PDSCH Mapping Type A, the first symbol used by DMRS can be either symbol 2 or 3 of the slot. For PDSCH Mapping Type B, the first symbol used by DMRS is always the first symbol of the resource allocation. DMRS symbols are allocated across the PDSCH allocation. Selection of Mapping Type A and B are part of time-domain resource allocation. S=Start Symbol Index, L=Number of Consecutive Symbols, One slot consists of 14 OFDM symbols.

Increasing the number of reference symbols impacts the throughput. At the same time, better channel estimation leads to lower NACKs (Lower BLER) and higher throughput. Lower BLER at UE can be improved also by reducing Effective Code Rate is based on both Reference Signal Pattern and MCS change and can be represented by the following:

$$CodeRate_{eff} = \frac{N_{RE,Slot} - N_{PDCCH} - N_{RS}}{N_{RE,Slot}} \eta(MCS_{index})$$

Wherein $N_{RE,Slot}$ is the number of Resource Elements (REs) per slot, $N_{PDCCH}$ is the number of REs allocated for PDCCH transmission within a slot, $N_{RB}$ is the number of RBs allocated for a user, $N_{RS}$ is the number of reference symbol elements within a slot, $\eta(\cdot)$ Spectral efficiency corresponds to the MCS Index ($MCS_{Index}$) as per 3GPP specifications, and $MCS_{Index}$—Modulation and Coding Index obtained from Link Adaptation module. RS—CodeRate$_{eff}$ is the effective code rate due to a change in the reference signal pattern. LA—CodeRate$_{eff}$ is the effective code rate due to change in MCS index by the link adaptation module. Both the code rate value is derived based on Effective code rate formula as discussed above.

According to various embodiments, the choice of usage of MCS adaptation (Link Adaptation) vs additional reference symbols is based on an option that supports a higher code rate. The gNB uses a dynamic determination of potential additional DMRS based on a number of PDSCH/PUSCH symbols used over medium-term and observed BLER vs targeted BLER. The gNB uses a dynamic configuration of CSI-RS based on current DMRS positions and observed BLER vs targeted BLER. The UE uses both the reference symbols for better interpolation/improved channel estimation across symbols in a fast-fading environment.

Figure 8:
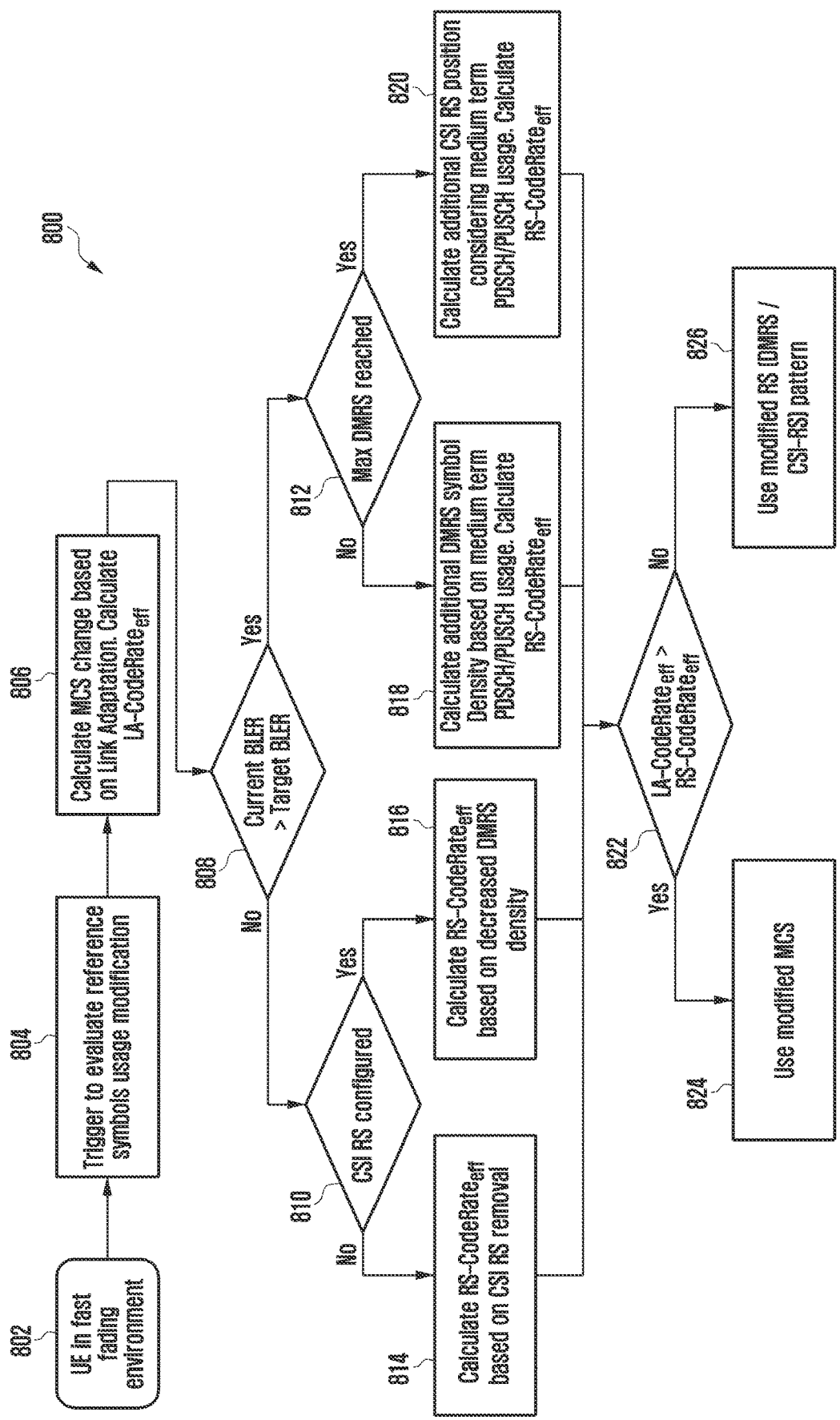
FIG. 8 illustrates a method to select the usage of MCS adaptation (Link Adaptation) vs additional reference symbols based on the option that supports a higher code rate, according to an embodiment of the disclosure.

FIG. 8 illustrates a method 800 to select the usage of MCS adaptation (Link Adaptation) vs additional reference symbols based on the option that supports a higher code rate, according to an embodiment of the disclosure.

Referring to FIG. 8, at operation 802, the gNB finds the UE channel conditions based on the feedback from UE. The fast fading environment for a UE can be identified based on at least one of high speed based UE based on Doppler estimate, high rate of change of UL SINR, or high rate of change of DL CQI.

At operation 804, it is determined if there is a need to evaluate RS density adjustment. The trigger criteria for RS density adjustment is the functionality to estimate the required number of DMRS and CSI-RS reference symbols. The RS density adjustment is triggered at the events: receipt of DL CQI/UL SINR, configurable number of PDSCH transmissions, and HARQ ACK/NACK within a given period, and configurable number of PUSCH transmissions and HARQ ACK/NACK within a given period.

At operation 806, LA—CodeRate$_{eff}$ is computed. Further, a change in MCS on the Link adaptation algorithm is determined. LA—CodeRate$_{eff}$ is essentially based on Inner loop (CQI) and outer loop (BLER) adjustments. Operation 806 is further described in conjunction with FIG. 11.

At operations 808-820, the appropriate position to add/remove reference signals based on PDCCH/PDSCH usage is selected. This is to make sure that reference symbols are appropriately distributed across PDSCH symbol transmission. In case of addition/removal of CSI-RS/DMRS in a slot, new reference signals code rate RS—CodeRate$_{eff}$ is obtained. At operations 822-826, the choice between RS density adjustment and Link Adaptation is made based on effective rate calculation. Operations 808-820 are further described in conjunction with FIGS. 12A to 12C, 13A, and 13B.

Figure 9:
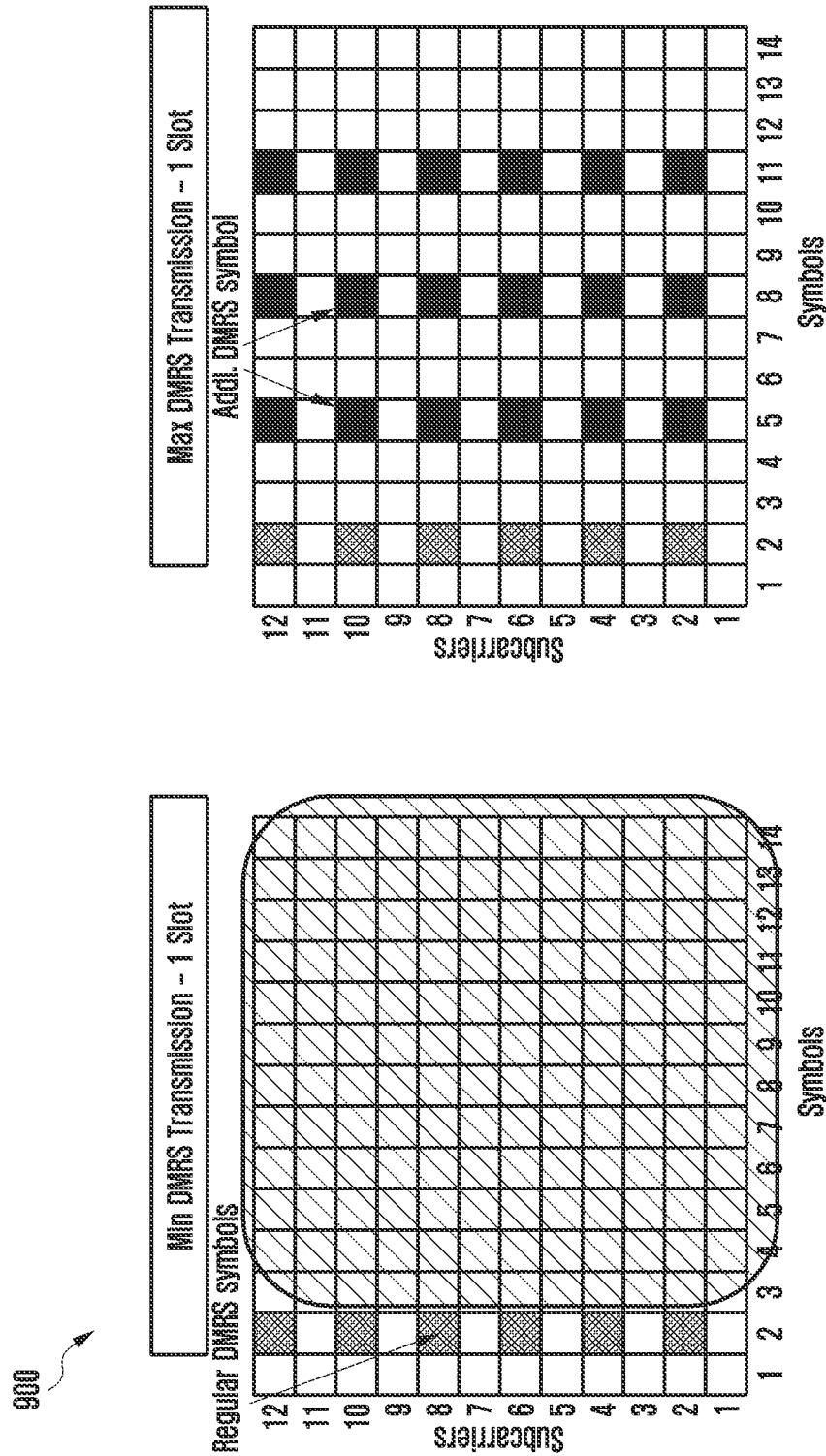
FIG. 9 illustrates the usage of an appropriate number of DMRS symbols for improved channel estimation of a UE in a fast-fading environment, according to an embodiment of the disclosure.

FIG. 9 illustrates the usage of an appropriate number of DMRS symbols for improved channel estimation of a UE in a fast-fading environment in resource block 900, according to an embodiment of the disclosure. In a fast fading environment, channel estimation based on DMRS interpolation across the symbols is weak/inaccurate. A UE with a low number of DMRS symbols may face poor channel estimation and thereby higher NACKs (Higher BLER). A UE with a very high number of DMRS symbols would face poor spectral efficiency and thereby a poor throughout.

Figure 10:
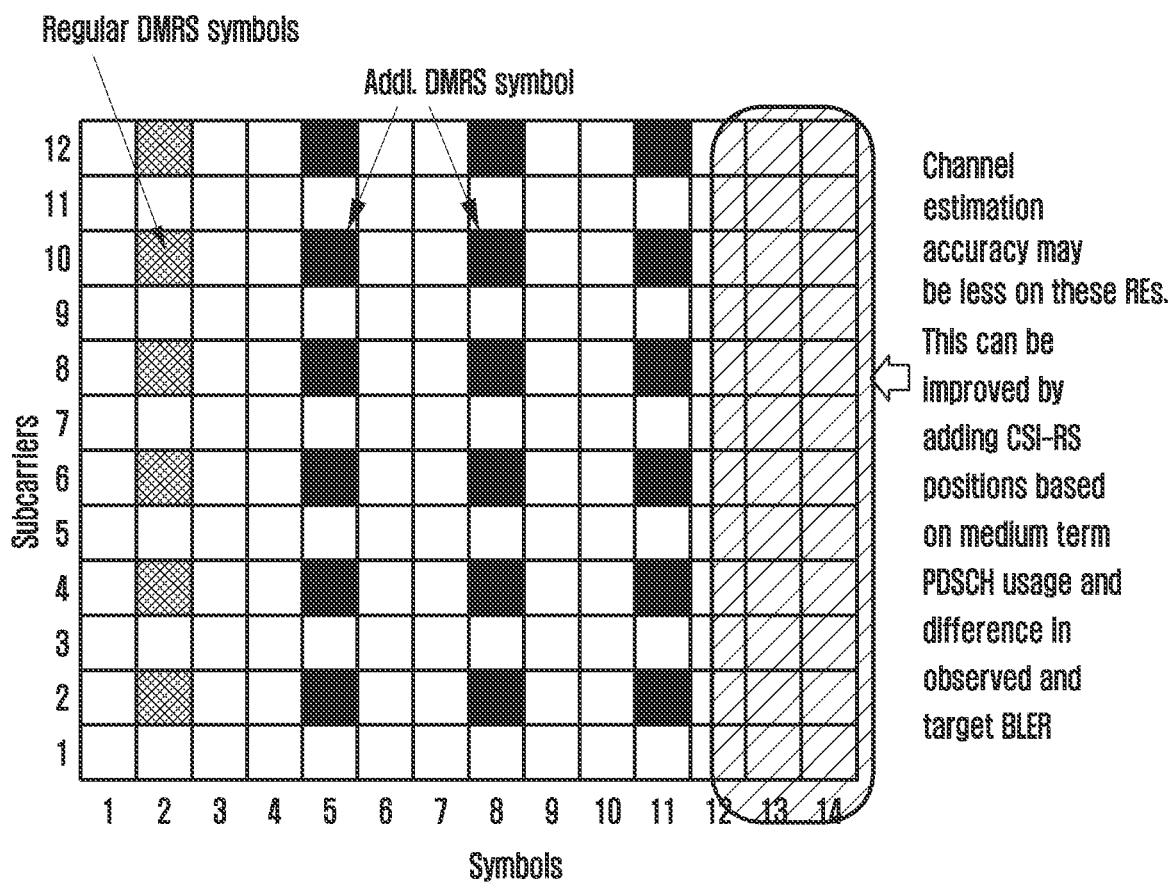
FIG. 10 illustrates the usage of CSI-RS in addition to DMRS symbols for improved channel estimation, according to an embodiment of the disclosure.

FIG. 10 illustrates the usage of CSI-RS in addition to DMRS symbols for improved channel estimation in resource block 1000, according to an embodiment of the disclosure. The dynamic determination of CSI-RS in addition to DMRS for a UE in a fast-fading environment is based on the condition: medium-term PDSCH/PUSCH usage, and the difference between observed and target BLER.

Figure 11:
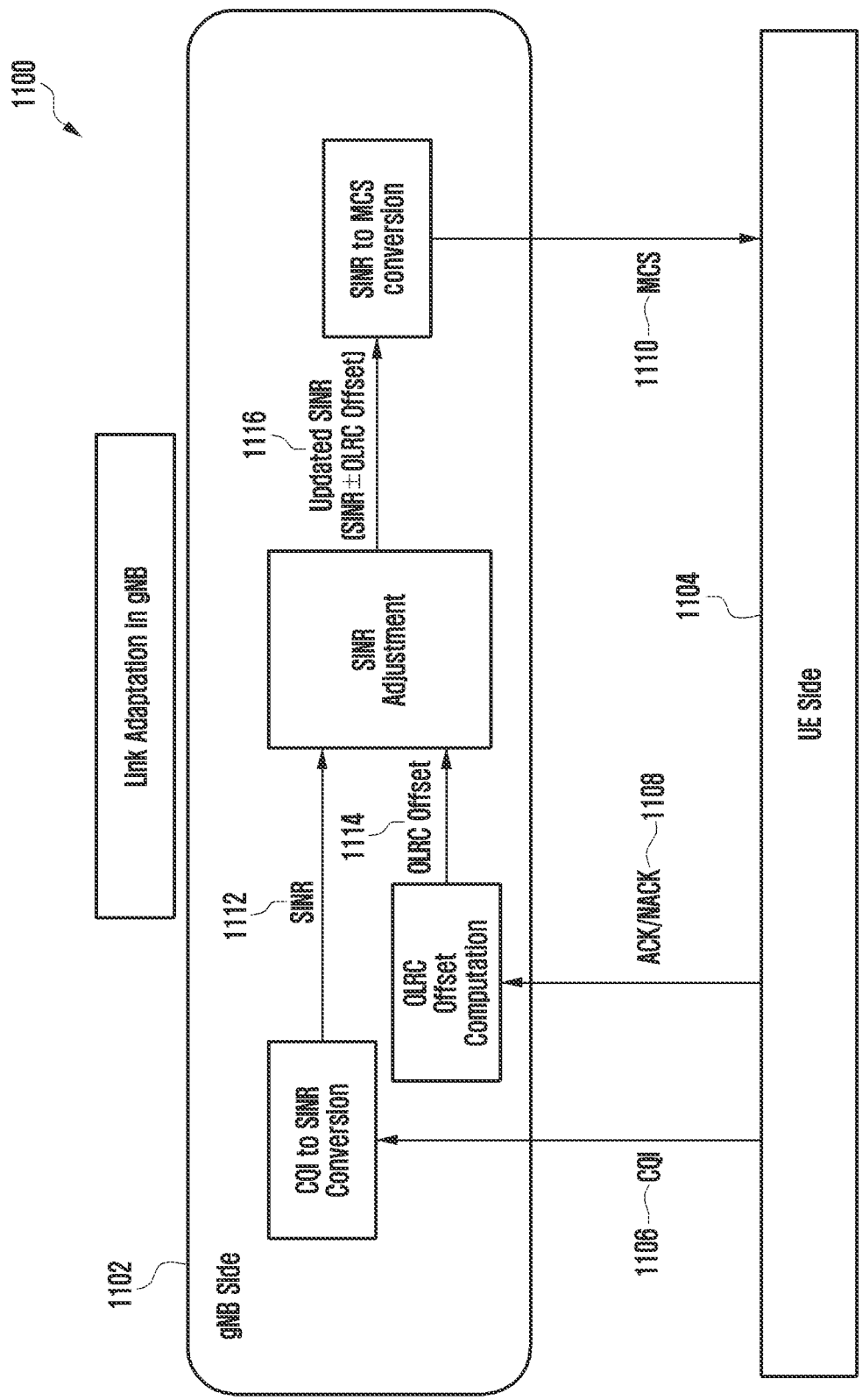
FIG. 11 illustrates link adaptation in gNB, according to an embodiment of the disclosure.

FIG. 11 illustrates a system 1100 for link adaptation in gNB 1102, according to an embodiment of the disclosure.

Referring to FIG. 11, a UE 1104 sends CQI 1106, and ACK/NACK 1108 towards the gNB 1102. The CQI 1106 at the gNB side, is converted to SINR 1112 for SINR adjustment. An OLRC offset 1114 computation is computed from the ACK/NACK 1108. The computed OLRC offset 1114 is sent for SINR adjustment. An updated SINR 1116 after the SINR adjustment is converted to MCS 1110. The MCS 1110 is then sent to the UE 1104 from the gNB 1102.

Figure 12:
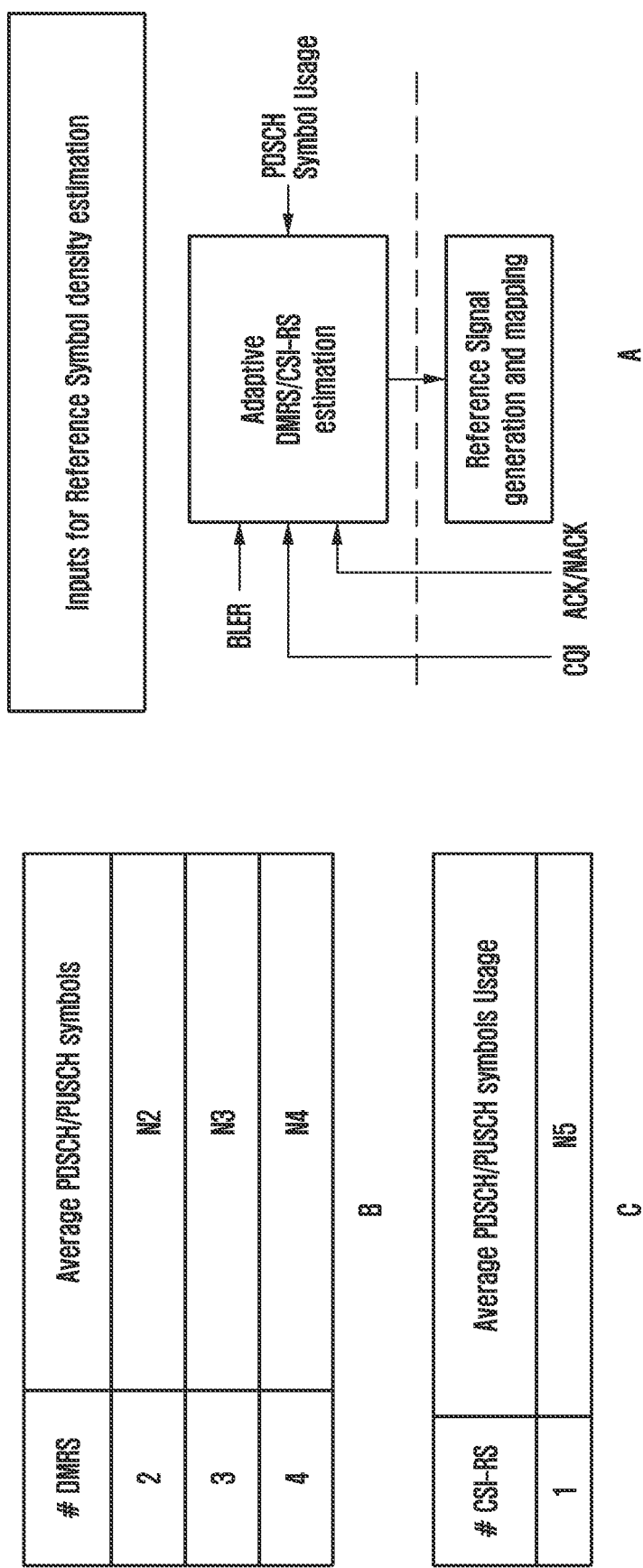
FIG. 12 illustrates inputs for Reference Symbol density estimation, increasing/decreasing DMRS, and thresholds for adding/removing CSI-RS, according to an embodiment of the disclosure.

FIG. 12 illustrates inputs for Reference Symbol density estimation, according to an embodiment of the disclosure. The estimation of the number of references symbols is based on an observed BLER calculation and PDSCH/PUSCH symbol usage estimation. In the observed BLER calculation, the actual BLER is measured using a sliding window of ACK/NACKs over a configured time interval. A minimum number of samples within the time period needed is decided. In the PDSCH/PUSCH symbol usage estimation, an IIR filtered-based mechanism is used to estimate the symbol usage. The filtered Symbol Usage is computed as the addition of a (Average Symbols in Current Period) and $(1-\alpha)$ Previous Filtered Average Symbols. Additional DMRS/CSI-RS symbols will be included in a slot if the Average number of PDSCH/PUSCH symbols is greater than the respective configured threshold.

Thresholds for increasing/decreasing DMRS and thresholds for adding/removing CSI-RS are illustrated in B and C of FIG. 12.

Referring to B of FIG. 12, average PDSCH/PUSCH symbols N2, N3, and N4 correspond to 2, 3, and 4 number of DMRS.

A Framework for Reference Signal Pattern is illustrated in C of FIG. 12, in accordance with an embodiment of the subject matter. In 5G NR systems, Physical Downlink Shared Channel (PDSCH) is always transmitted in combination with DMRS for the same antenna ports. The DMRS pattern for PDSCH has been specified to be flexible and support a wide range of configurations by considering MIMO requirements. The disclosure describes 5G NR standard oriented framework to adjust the DMRS pilot pattern as per the Acknowledgement (ACK)/Negative ACK (NACK) responses for the transmitted data, Target BLER, Number of PDSCH symbols ($N_{PDSCH}$) and reported a Channel Quality Indicator (CQI) value. The reference signal pattern is computed using the framework to be communicated to the physical layer for signal generation.

The framework of the disclosure aims to maximize the cell and per UE throughput in both Downlink and Uplink direction with considerable channel estimation accuracy and code rate calculations. According to an example embodiment of the disclosure, gNB uses Dynamic determination of potential additional DMRS based on the number of PDSCH/PUSCH symbols used over the medium term and observed BLER vs targeted BLER. gNB uses the Dynamic configuration of CSI-RS based on current DMRS positions and observed BLER vs targeted BLER. Choice of usage of MCS adaptation (Link Adaptation) vs additional reference symbols based on the option that supports higher code rate. Additionally, gNB also uses a neural Net/AI-based approach to choose decision criteria for increasing/decreasing DMRS, CSI symbols and deciding the choice between MCS adaptation and increase/decrease of reference symbols. UE uses both the reference symbols for better interpolation/improved channel estimation across symbols in a fast-fading environment.

According to techniques, reference signal (RS) transmission for mmWave cellular system using a directional antenna beam can be performed by considering beam angular coverage of the related art. This technique ensures a fair number of reference signal coverage improvements of the related art. However, the technique can be optimized by considering the reference signal patterns across all the transmitted beams of the related art. In another technique, of the related art, adjustment of Reference signals transmission is employed to reduce the remote interference for 5G NR systems by considering the interference across gNodeBs (gNBs).

In other techniques of the related art, a dynamic selection of pilot patterns in MIMO-OFDM systems is considered and proposes an optimal power distribution between data and pilot symbols by maximizing the upper bound of constrained capacity. However, this technique can be further analyzed by considering reference signal patterns in 5G NR systems.

In a further technique of the related art, reference signal design for the scenarios of multiplexing eMBB and uRLLC data in Downlink is employed. In this technique, the reference signals can be considered as a flag to indicate the type of data transmission. However, this technique is not optimal under low coverage or cell edge scenarios due to high channel variations.

In another technique of the related art, adaptive pilot pattern design for Long Term Evolution (LTE) based transmission is provided by explaining the impact of distance between pilots in slot-based transmission systems.

As described earlier that various methods/models/concepts have been described for a better understanding of the disclosure. In this regard, an analytical study of the MIMO OFDM transmission model in the 5G NR system, the concept of interpolated channel estimation, post SINR calculation and code rate calculations, and a derived cost function for optimal pilot pattern design with the impact of change in code rates are discussed below.

For example, the MIMO transmission model having $N_t$ transmit antennas and $N_r$ receive antennas is considered. Received signal from $n_r$-th receive antenna at time n for $k^{th}$ subcarrier can be written as $$Y_{n_r}[n, k] = \sum_{n_t=0}^{N_t-1} H_{n_t,n_r}[n, k] X_{n_t}[n, k] + V_{n_r}[n, k] \qquad \text{Equation 1}$$

wherein, $H_{n_t,n_r}$ is the frequency domain representation of the channel matrix from $n_t$-th transmit and $n_r$-th receive antenna. $X_{n_t}$ is the transmit symbol after pre-coding and $V_{n_r}$ represents Additive White Gaussian Noise (AWGN) signal with zero mean and variance $\sigma_n^2$ on the $n_r$-th receive antenna. $X_{n_t}[n, k]$ contain both data and reference symbols. For mathematical derivations, it is assumed that pilots' symbols are uniformly distributed across the time and frequency domains with a distance of G and L. With this assumption, per antenna port representation of transmitting data $X_{n_t}$ can be factorized as follows, $$X[n, k] = X[bG + g, mL + l]; \qquad \text{Equation 2}$$
$$m = 0, \ldots, N_P - 1; b = 0, 1 \ldots, N_L - 1$$

$$X[n,k] = \begin{cases} X_P[b,m]; & l=0; g=0 \\ \text{Data}; & g=1,\ldots G-1, l=1,\ldots,L-1 \end{cases} \quad \text{Equation 3}$$

where, $X_P$ is the $N_L \times N_P$ pilot symbol matrix contains the complex reference signals which are mapped across Resource Blocks (RB) within a slot. g and l are the indexes for data symbols mapping between reference symbols in the time and frequency axis. Typically, a slot contains 14 OFDM symbols and 12 subcarriers per antenna port. The dimension of $X_P$ depends on the density of the reference signal and the allocated number of RBs for a UE. For further derivation, the MIMO input-output model relation for a received OFDM symbol can be represented as, $$Y_{n_r}[n,k] = \underbrace{\sum_{n_t=0}^{N_t-1} H_{n_t,n_r}[n,k]X_{n_t}[n,k] + \sum_{n_t=0}^{N_t-1}}_{ICI+Noise} \quad \text{Equation 4}$$

$$\sum_{k \neq p} H_{n_t n_r}[n,p]X_{n_t}[n,p] + V_{n_r}[n,k]$$

The second part of the above equation represents the Inter-Carrier Interference (ICI) and Noise with variance $\sigma_{ICI}^2$ and $\sigma_n^2$ respectively. The total transmit power on each data symbol position is $\sigma_s^2$, it is adjusted as per the antenna ports ($N_{AP}$).

Further, in 5G NR systems, DMRS symbols are generated based on pre-defined configurations to maintain the orthogonality across transmit antennas and cells. Such reference signals are used to estimate the MIMO channel across $N_t N_r$ channels. An interpolated channel estimate at data position (g=1, ... G-1, l=1, ..., L-1) can be obtained by a weighted sum of channel estimates derived from the pilot positions (l=0; g=0). The concept of linear channel estimation and interpolation is already known in the art. It is given that, Minimum Mean Square Estimation (MMSE) based channel estimation is optimal under cell edge scenarios where SINR levels are low. However, the complexity of the MMSE technique is relatively high as compared with Least Square (LS) channel estimation. Operational complexity is one of the key measures to be considered for real-time operations in which channel estimation is carried out in microsecond intervals. LS estimates at pilot positions can be written as:

$$\widetilde{H}_P[b,m] = \frac{Y_P[bG, mL]}{X_P[bG, mL]}, \quad \text{Equation 5}$$

where $m = 0, \ldots, N_P - 1; b-, 1, \ldots, N_L - 1$ $H_P$ is the $N_L \times N_P$ channel estimation matrix which will be interpolated to obtain the channel estimates at data positions. In real-time scenarios, channel estimates are interpolated in the frequency domain followed by the time domain. The interpolated channel estimates at data positions can be defined as $$\widetilde{H_d}[n, mL+l]_{l \neq 0} = \sum_{m=0}^{N_P-1} w_m \widetilde{H}_p[b,m] \quad \text{Equation 6}$$

$$\widetilde{H_d}[bG+g, k]_{g \neq 0} = \sum_{b=0}^{N_L-1} w_b \widetilde{H_d}[b,k]\ldots \quad \text{Equation 7}$$

The performance of data demodulation depends on the accurate estimation of channel response which depends on multiple factors. The Mean Square Error (MSE) of the channel estimates at the data positions can be stated as, $$MSE_{\forall n,k,n_r,n_t} = \|H - \hat{H}\| = \left(\frac{\sigma_n^2 + \sigma_{ICI}^2}{\sigma_s^2} + \sigma_w^2\right) \quad \text{Equation 8}$$

$\sigma_w^2$ is the error variance due to improper weights for combining channel estimates which can cause interpolation errors. This will lead to variations in channel estimates that depend on $N_P$, $N_L$, L and G values. As per 3GPP specifications, the ratio of a pilot-to-data symbol ($PD_{ratio}$) power can be adjusted through Radio Resource Configuration (RRC) messages and it plays a major role in maximizing the post equalization SINR in order to estimate the data symbol accurately.

$$PD_{ratio} = \frac{\sigma_P^2}{\sigma_d^2} \quad \text{Equation 9}$$

Where $\sigma_d^2$ is the power of the data symbol which is distributed across the considered antenna ports. $\sigma_s^2 = \sigma_d^2/\sqrt{N_{AP}}$. It is always considered as $\sigma_P^2 > \sigma_d^2$.

5G NR system is designed to support a variety of applications in a high-speed environment typically from 500 Km/Hr to 1000 Km/Hr. In such cases, the channel is fast time-varying. As is already known in the art, a diamond-shaped pilot pattern design is preferable in a doubly selective channel environment for an optimal MSE performance. As per 5G NR specifications, it may not be possible to design a diamond-shaped channel estimation. Within a slot, pilot symbol locations are fixed in the frequency domain and the density of reference signals can be varied only in the time axis through RRC messages. In the disclosure, the cost function for the optimal channel pilot pattern design is considered as channel capacity obtained from post-processing SINR. However, it depends on the distance between pilots' symbols across time and frequency. For further analysis, the impact of code rate is analyzed against determining optimal pilot density for a given channel model. The estimated average post equalization SINR ($\hat{\gamma}$) based on LS channel estimates can be written as:

$$\hat{\gamma} = \frac{\sigma_s^2}{(\sigma_n^2 + \sigma_{ICI}^2 + \sigma_s^2 \sigma_w^2)(\hat{H}^H H)^{-1}} \quad \text{Equation 10}$$

The optimal value of pilot density can depend on maximizing the post-equalization SINR. The post equalization SINR can be maximized by keeping the pilot density more with a smaller distance between adjacent pilot symbols. However, this will decrease the available bandwidth for data transmission significantly. Sometimes, it may not be possible to meet the desired data rate due to excessive reference symbols. Hence the cost function should be derived by considering the transmission pilot density ($D^t$). The new cost function based on $\hat{\gamma}$ and $D^t$ can be derived as $$\psi = B(D^t)\log_2(1 + \hat{\gamma}) \quad \text{Equation 11}$$

Where B(·) is the bandwidth utilized for data transmission with pilot density $D^r$. The impact of precoding and additional physical layer processing blocks can be incorporated into the cost function. The cost function requires prior knowledge of channel estimates and it is effective when the channel is semi-static. The cost function can be extended to the MIMO scenario by considering SINR and pilot pattern across the transmit antenna ports.

Figure 13A:
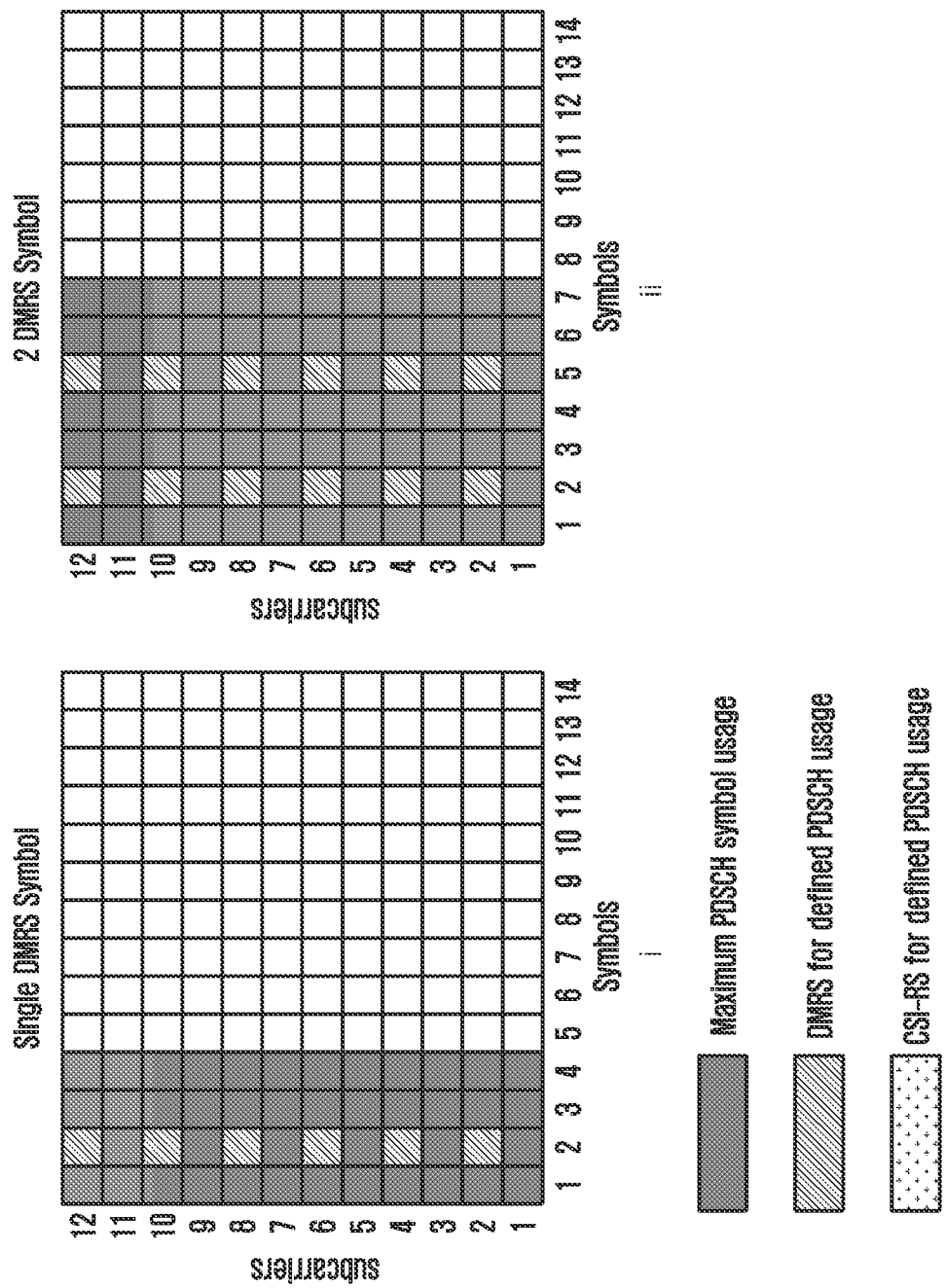
FIG. 13A illustrates configurations of a subframe with (i) a single DMRS symbol, and (ii) two DMRS symbols, according to an embodiment of the disclosure.
Figure 13B:
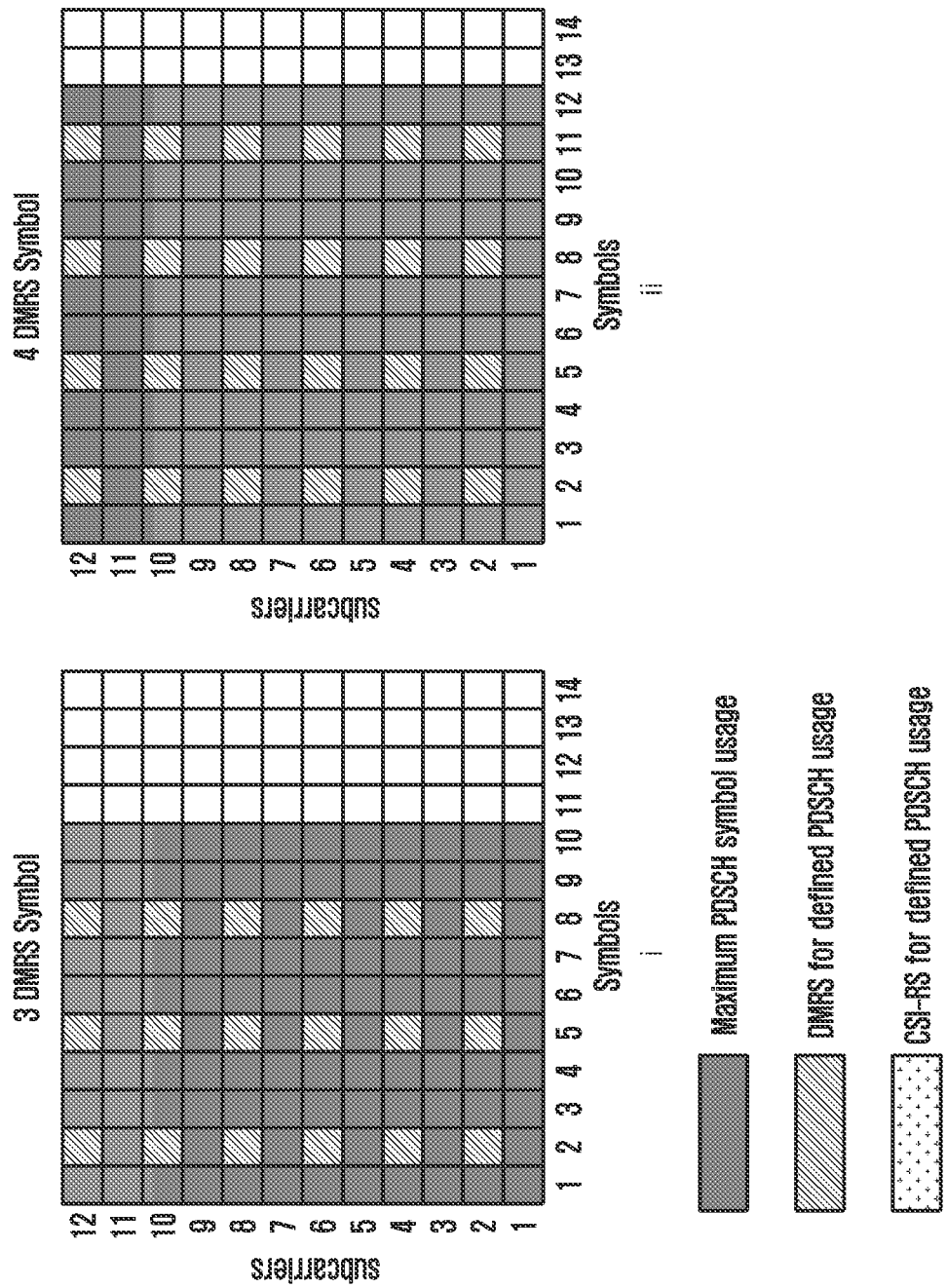
FIG. 13B illustrates configurations of a subframe with (i) three DMRS symbols, and (ii) four DMRS symbols, according to an embodiment of the disclosure.
Figure 13C:
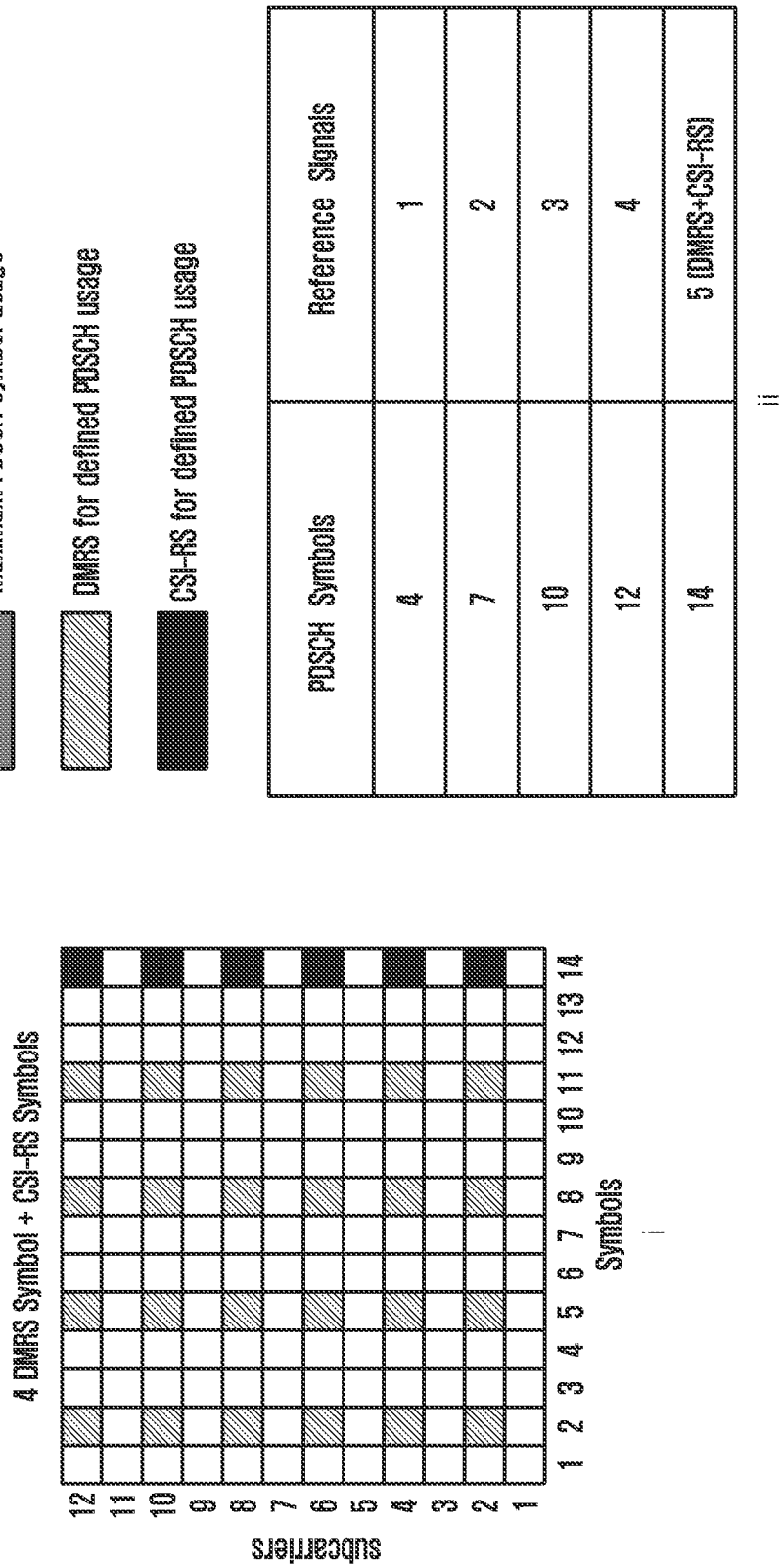
FIG. 13C illustrates (i) configurations of a subframe with four DMRS symbols and CSI-RS symbols, and (ii) correlation of PDSCH and Reference Symbols, according to an embodiment of the disclosure.

FIG. 13A illustrates configurations of a subframe with (i) a single DMRS symbol, and (ii) two DMRS symbols, according to an embodiment of the disclosure. FIG. 13B illustrates configurations of a subframe with (i) three DMRS symbols, and (ii) four DMRS symbols, according to an embodiment of the disclosure. FIG. 13C illustrates (i) configurations of a subframe with four DMRS symbols and CSI-RS symbols, and (ii) correlation of PDSCH and Reference Symbols, according to an embodiment of the disclosure.

FIG. 14 illustrates a table 1400 including the estimates for the choice between RS density adjustment and Link Adaptation based on effective rate calculation, according to an embodiment of the disclosure.

Figure 15:
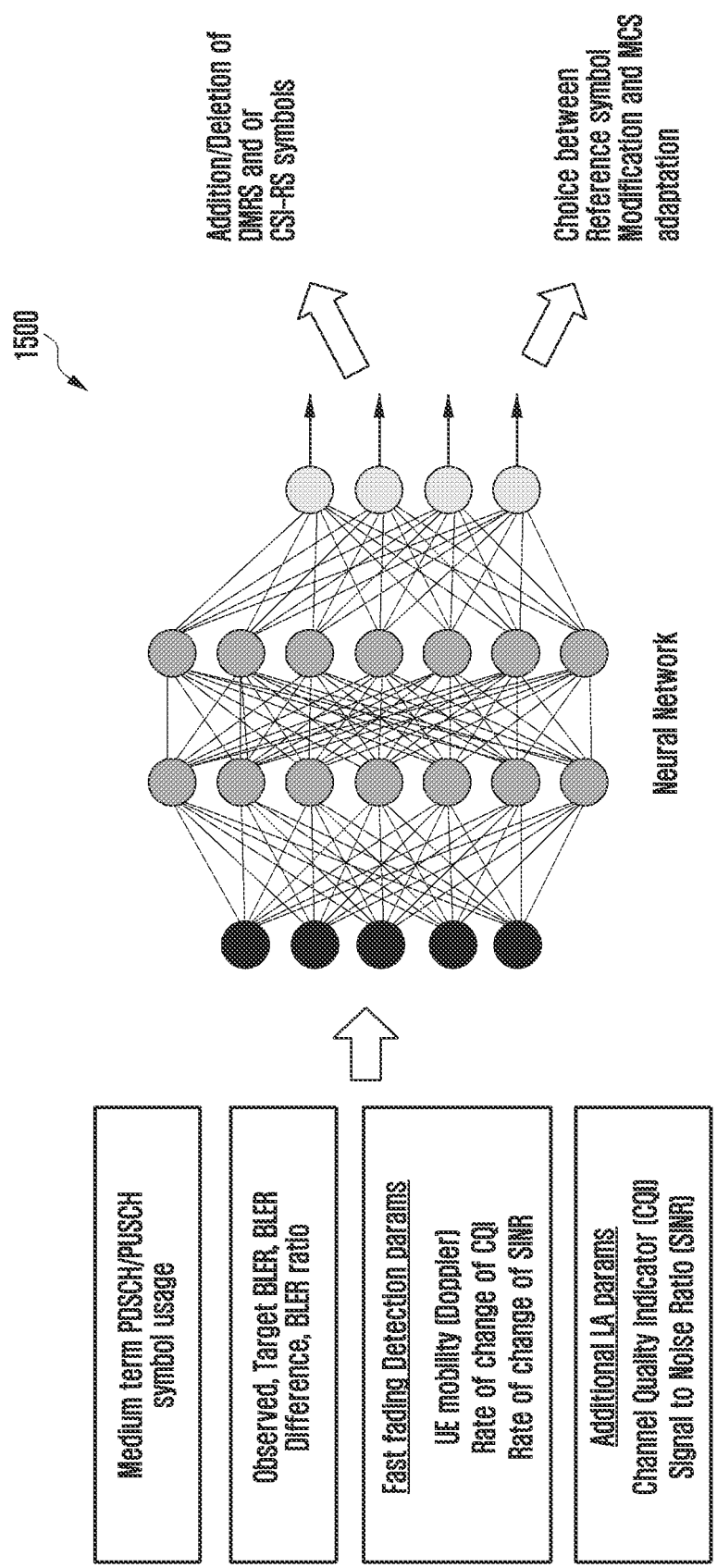
FIG. 15 illustrates AI/ML and Neural Network-based solution to predict reference symbol pattern, according to an embodiment of the disclosure.

FIG. 15 illustrates AI/ML and Neural Network-based solutions 1500 to predict reference symbol patterns, according to an embodiment of the disclosure. The Neural network uses the parameters (medium-term PDSCH/PUSCH Symbol usage, observed BLER, target BLER, UE mobility, CQI, SINR) and stored past output data from its memory. Based on these input parameters, trained weights are computed and neural network, for throughput improvement, (i) predicts whether additional DMRS/CSI-RS are needed to be added or removed, and (ii) predicts which is a better choice between Link Adaptation and Reference signal adaptation.

Figure 16:
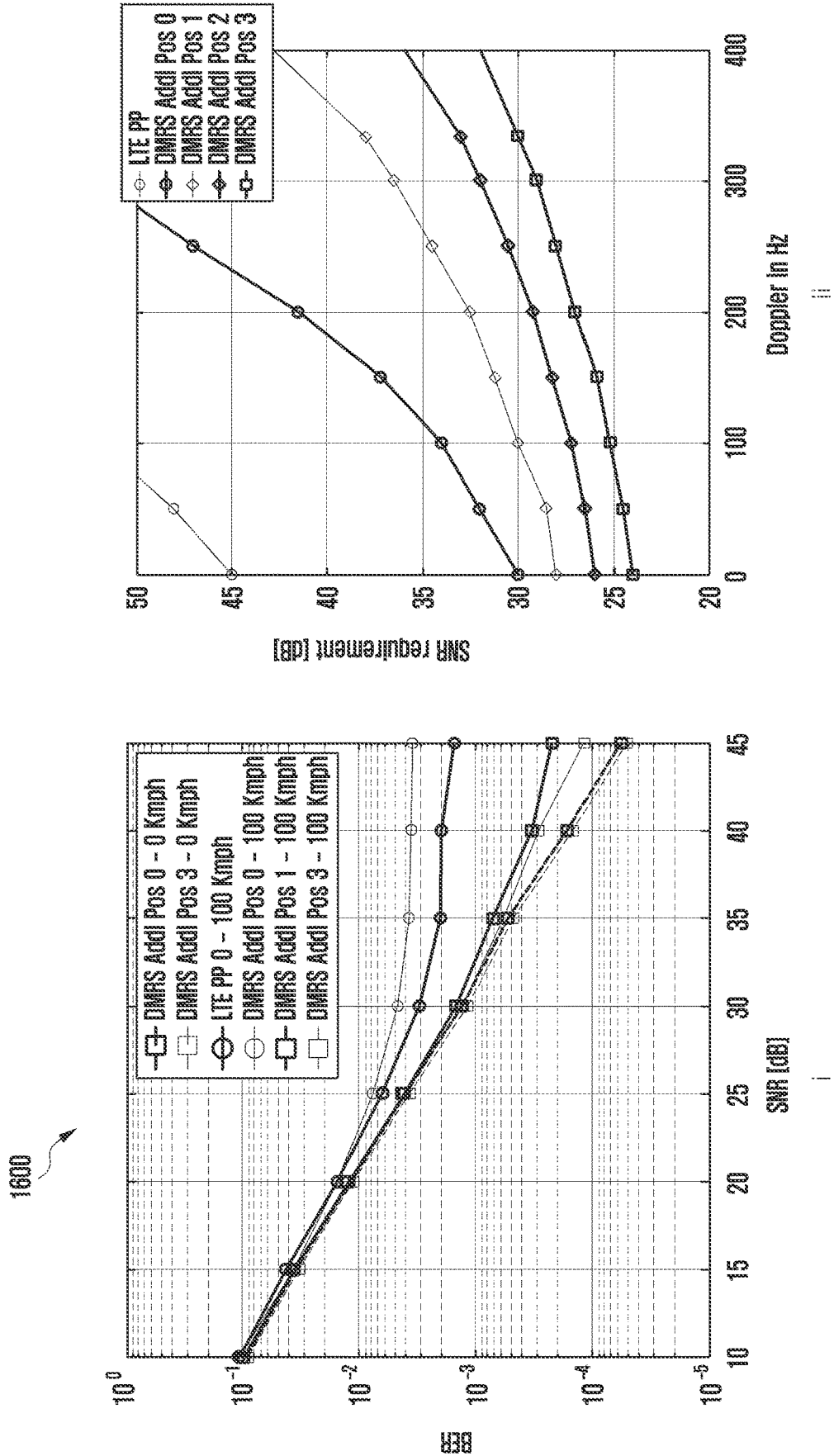
FIG. 16 illustrates (i) BER performance of a system for various DMRS Type 1 pilot patterns on different channel conditions and SNR levels, and (ii) SNR requirement to meet the target BLER of 10% for different DMRS patterns as a function of Doppler frequency, according to an embodiment of the disclosure.

FIG. 16 illustrates (i) BER performance of a system for various DMRS Type 1 pilot patterns on different channel conditions and SNR levels (graph 1600), and (ii) SNR requirement to meet the target BLER of 10% for different DMRS patterns as a function of Doppler frequency, according to an embodiment of the disclosure.

Referring to (i) of FIG. 16, the error rate at the UE side can be reduced by sending additional DMRS symbols in the gNB. The results are compared against the LTE standard reference signal transmission for the different Doppler frequencies. It can be observed from solid curves in the FIG. 16, there is a significant gain in SNR by incorporating the additional reference symbols when there is substantial Doppler in the system. Standard blocks in 5G NR specifications are considered for simulations.

Referring to (ii) of FIG. 16, in real-time scenarios, the SINR of the transmission link is fixed. Hence, in order to meet the target BLER, the pilot pattern can be varied as per the channel conditions. From the figure, it can be observed that the SNR requirement to meet the Target BLER can be reduced significantly by incorporating additional DMRS positions leading to power saving at gNB side. The same behavior can be observed across all the Doppler frequencies. However, adding additional DMRS symbols will reduce the Cell and Per UE throughput for the cost of a reduction in operating SNR.

Figure 17:
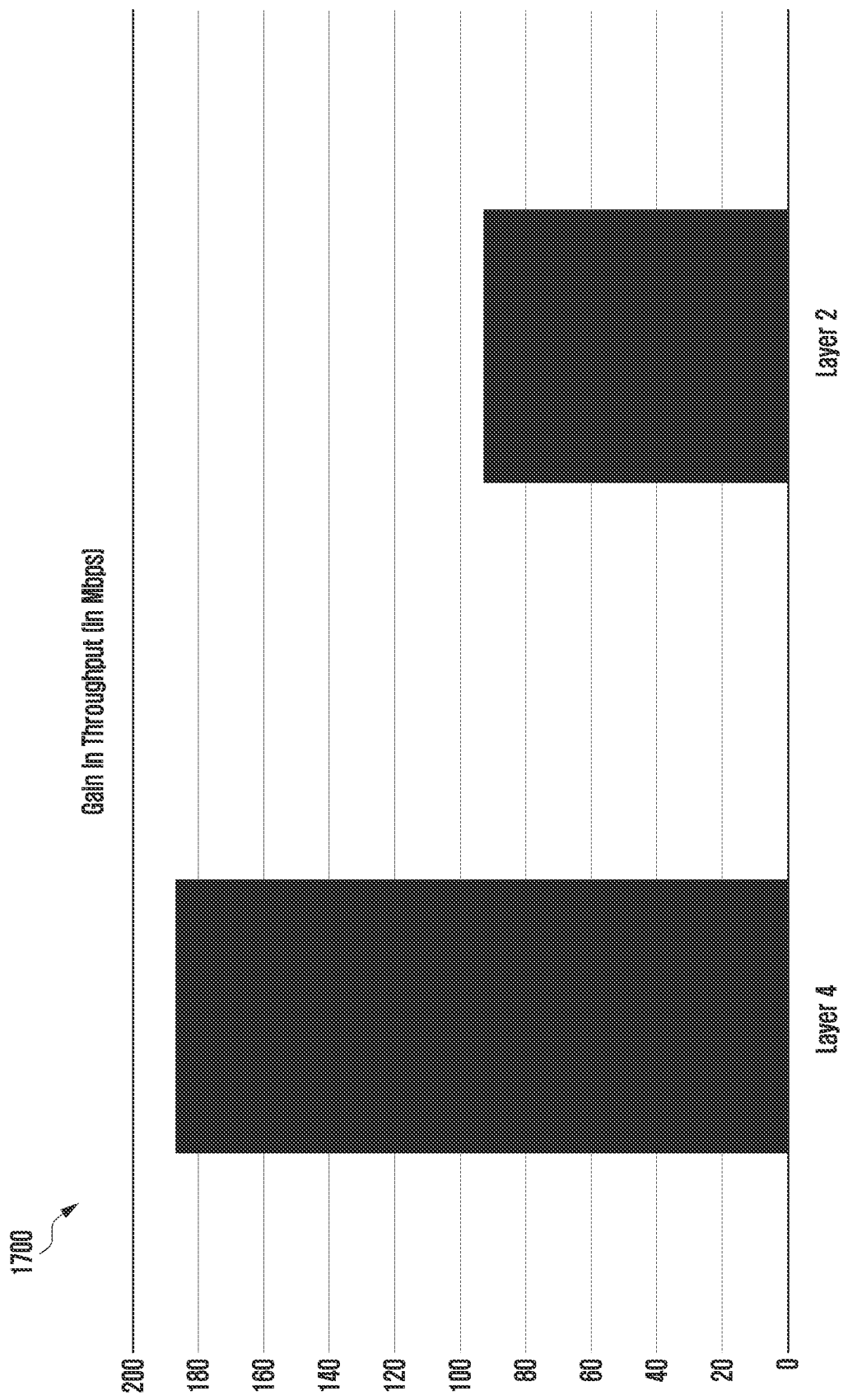
FIGS. 17 and 18 illustrate simulation results and stimulation parameters applied during the simulations, according to various embodiments of the disclosure.
Figure 18:
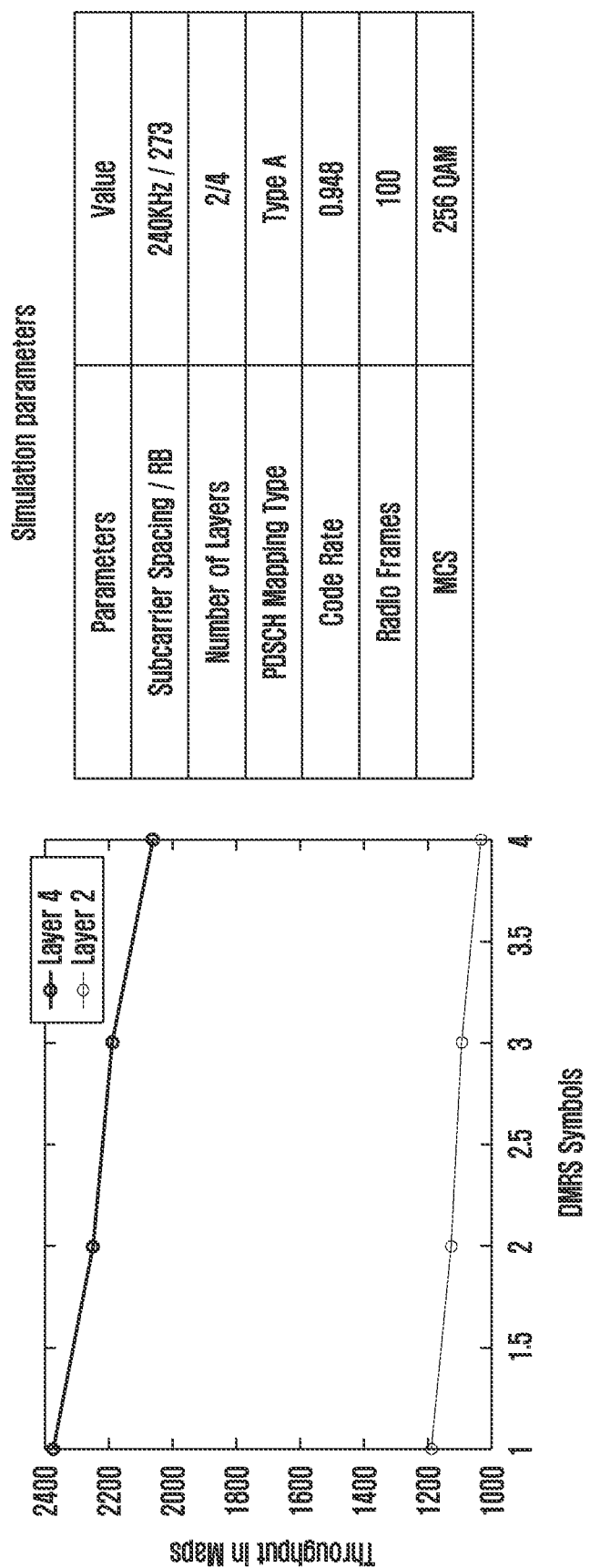
Figure 19:
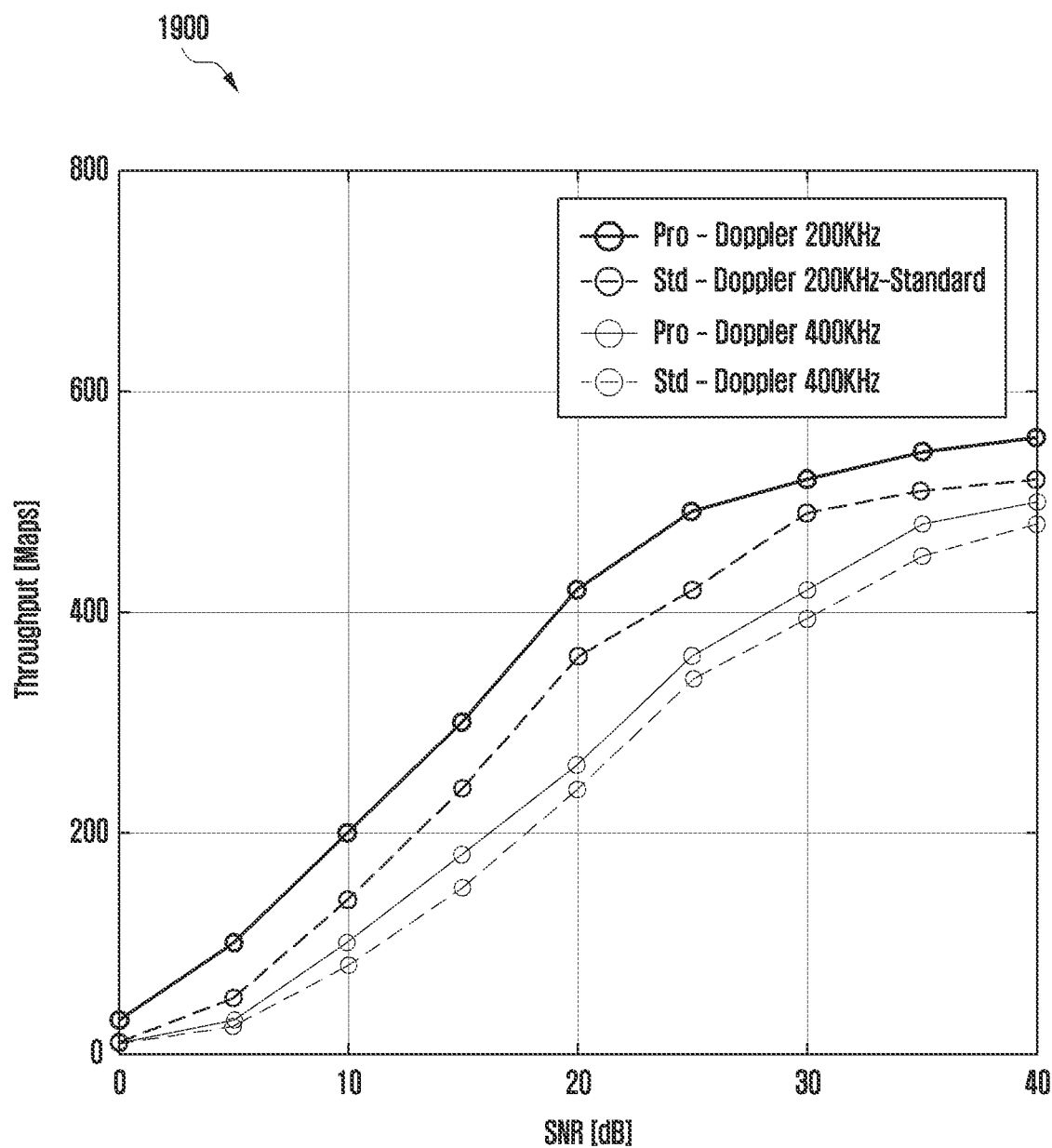
FIG. 19 illustrates simulation results for the throughput comparison of proposed adaptive pilot pattern approach with standard 5G compliant pilot pattern, according to an embodiment of the disclosure.

FIGS. 17, 18, and 19 illustrate simulation results, according to an embodiment of the disclosure. Simulation results depict that, there is a significant gain in throughput using the proposed method in both Layer 4 and Layer 2 transmission schemes. Additionally, it can be seen that a similar kind of throughput can be observed across all code rates and subcarrier spacing. The percentage of gain in throughput depends on the channel conditions, and Target BLER, etc. It can be concluded from the figure that the disclosure is best suitable for small Cell/Femto/Indoor gNBs in which conditions are fast time-varying in nature. In (ii) of FIG. 18, the stimulation parameters applied during the 1700 and 1800 simulations of FIGS. 17 and 18, respectively, are illustrated, in accordance with some embodiments of the disclosure. For example, subcarrier Spacing/RB, number of layers, PDSCH mapping type, code rate, radio frames, and MCS of values 240 KHz/273, 2/4, Type A, 0.948, 100, and 256 QAM, respectively, were used.

FIG. 19 illustrates a graph 1900 of the simulation results for the throughput comparison of the proposed adaptive pilot pattern approach with standard 5G compliant pilot pattern, according to an embodiment of the disclosure. The disclosure has been compared for a system having two different pilot patterns at a Doppler frequency of 200 Hz and 400 Hz. The dashed curves represent the throughput metrics for the standard pilot pattern defined in 5G NR specifications. The solid lines represent the performance of the proposed adaptive pilot pattern technique over the existing 5G NR system. It can be seen that there is a marginal improvement in throughput can be observed for an SNR range of 10 dB-30 dB due to code rate optimization Similar responses can be observed for other channels with different pilot patterns.

Figure 20:
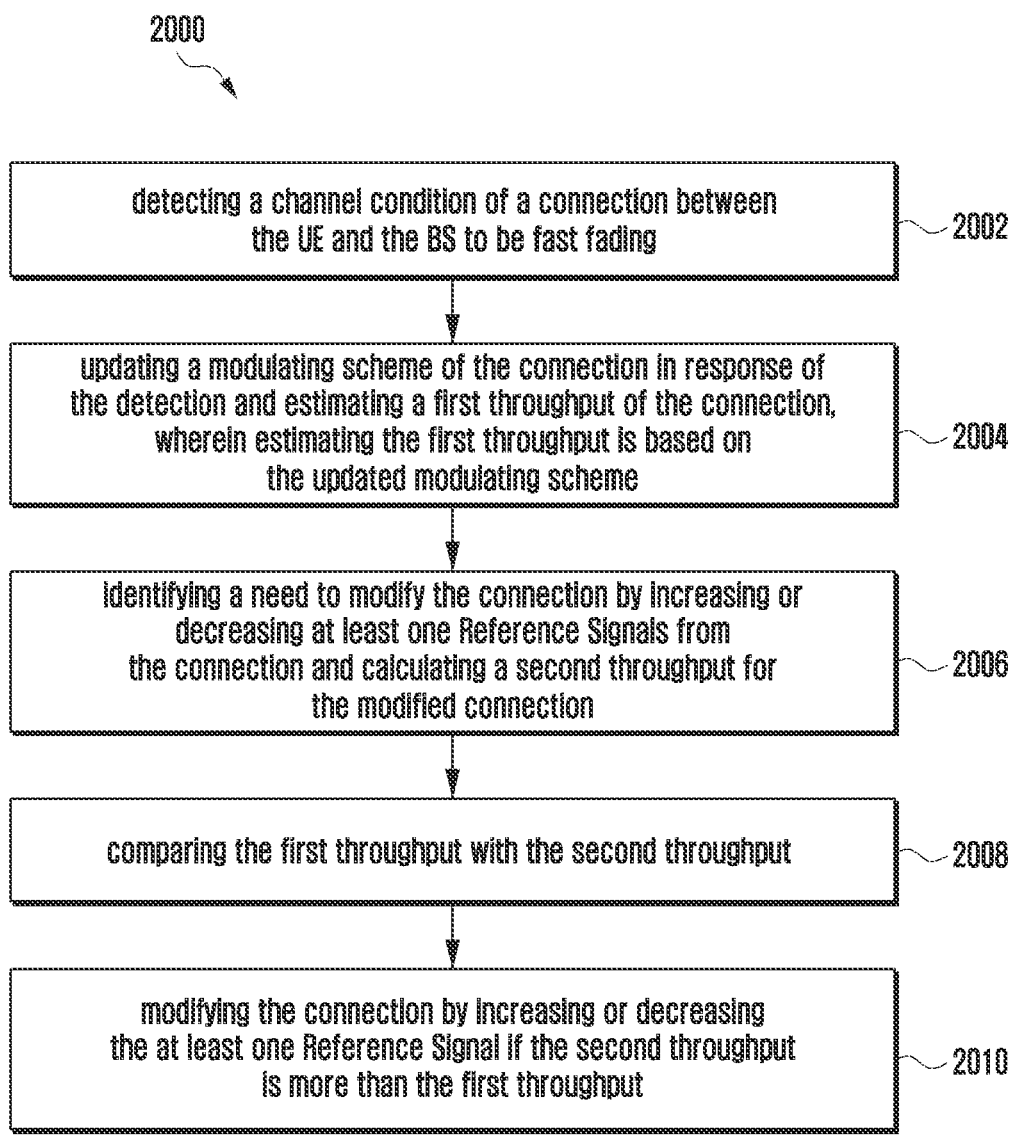
FIG. 20 illustrates a flow chart of a method for improving throughput for User Equipment (UE) by a Base Station (BS) in a wireless communication network, according to an embodiment of the disclosure.

FIG. 20 illustrates a flow chart of a method 2000 for improving throughput for User Equipment, UE, by a Base Station, BS, in a wireless communication network, according to an embodiment of the disclosure.

Referring to FIG. 20, method 2000 includes operation 2002, detecting a channel condition of a connection between the UE and the BS to be fast fading. At operation 2004, the method includes updating a modulating scheme of the connection in response to the detection, and estimating a first throughput of the connection. The step of estimating the first throughput is based on the updated modulating scheme. This step of estimating the first throughput may also be based on the erstwhile number of reference symbols along with the updated modulating scheme. At operation 2006, the method includes identifying a need to modify the connection by increasing or decreasing at least one Reference Signals from the connection and calculating a second throughput for the modified connection. At operation 2008, the method includes comparing the first throughput with the second throughput. At operation 2010, the method includes modifying the connection by increasing or decreasing at least one Reference Signal if the second throughput is more than the first throughput.

In another embodiment, the method further includes continuing the connection with the updated Modulating scheme if the second throughput is less or equal to the first throughput.

In another embodiment, the step of detecting the fast-fading channel conditions is based on at least one of high speed-based UE based on Doppler estimate, high rate of change of UL SINR, and high rate of change of CQI.

In another embodiment, the step of identifying a need to modify the connection by increasing or decreasing at least one Reference Signals from the connection is based on receipt of at least one of DL CQI, UL SINR, configurable number of PDSCH transmissions and HARQ ACK/NACK within a given period, and configurable number of PUSCH transmissions and HARQ ACK/NACK within a given period.

Figure 21:
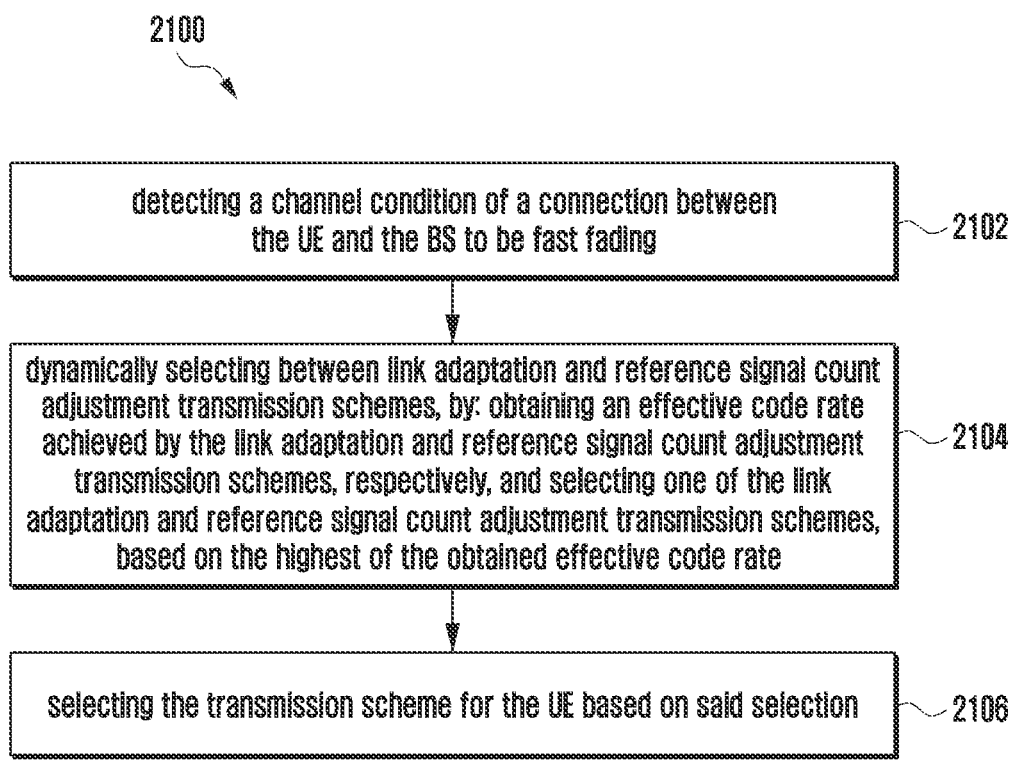
FIG. 21 illustrates a flow chart of a method of improving the throughput for User Equipment (UE) by a Base Station (BS) in a wireless communication network, according to an embodiment of the disclosure.

FIG. 21 illustrates a flow chart of a method 2100 of improving the throughput for User Equipment, UE, by a Base Station, BS, in a wireless communication network, according to an embodiment of the disclosure.

Referring to FIG. 21, the method includes, at operation 2102, detecting a channel condition of a connection between the UE and the BS to be fast fading. The operation 2104, the method includes dynamically selecting between link adaptation and reference signal count adjustment transmission schemes. The dynamic selection between link adaptation and reference signal count adjustment transmission schemes includes obtaining an effective code rate achieved by the link adaptation and reference signal count adjustment transmission schemes, respectively, and selecting one of the link adaptation and reference signal count adjustment transmission schemes, based on the highest of the obtained effective code rate. At operation 2106, the method includes selecting the transmission scheme for the UE based on said selection.

In another embodiment, the step of detecting the fast-fading channel conditions is based on at least one of high speed-based UE based on Doppler estimate, high rate of change of UL SINR, and high rate of change of CQI.

In another embodiment, the method includes determining a requirement to evaluate Reference Symbol density adjustment.

In another embodiment, the step of determining the requirement to evaluate Reference Symbol density adjustment is triggered based on receipt of at least one of DL CQI, UL SINR, a configurable number of PDSCH transmissions and HARQ ACK/NACK within a given period, and a configurable number of PUSCH transmissions and HARQ ACK/NACK within a given period.

In another embodiment, the step of obtaining the effective code rate achieved by the link adaptation, LA—CodeRate$_{eff}$, is based on the erstwhile available number of REs for data transmission, and the new MCS Index was chosen by the Link adaptation algorithm In another embodiment, the step of obtaining the effective code rate achieved by the link adaptation LA—CodeRate$_{eff}$ is based on Inner loop (CQI) and outer loop (BLER) adjustments, wherein BLER adjustments are done based on the difference between Target and Observed BLER.

In another embodiment, the method includes determining the appropriate positions to add or remove reference signals based on PDSCH usage, to ensure that reference symbols are appropriately distributed across PDSCH symbol transmission.

In another embodiment, the step of obtaining the effective code rate achieved by addition or removal of CSI-RS/DMRS in a slot, RS—CodeRate$_{eff}$ is based on the erstwhile MCS Index chosen by the Link adaptation algorithm and the newly chosen number of REs for data transmission.

In another embodiment, the method includes estimating the number of reference symbols based on at least one of observed Block Error Rate, BLER, Target BLER for the transmission, and PDSCH/PUSCH symbol usage estimation.

In another embodiment, the observed BLER is based on actual BLER measured using a sliding window of ACK/NACKs over a configured time interval, and a minimum number of samples within the time period.

In another embodiment, the PDSCH/PUSCH symbol usage estimation is based on at least one of IIR filtered-based mechanism and filtered symbol usage.

In another embodiment, the filtered symbol usage is based on average symbols in the current slot and previous filtered average symbols.

In another embodiment, the method includes increasing/decreasing the reference symbols DMRS/CSI-RS symbols in a slot when the average number of PDSCH/PUSCH symbols is greater/lesser than a predetermined threshold.

In another embodiment, the step of obtaining the effective code rate achieved by the reference signal count adjustment RS—CodeRate$_{eff}$ includes increasing the DMRS symbol density when the instantaneous BLER obtained for DL transmission is greater than target BLER and when maximum DMRS symbol count is not reached, or adding CSI-RS when the instantaneous BLER obtained for DL transmission is greater than target BLER and when maximum DMRS symbol count is reached, or removing the CSI-RS symbol when the instantaneous BLER obtained for DL transmission is lesser than the target BLER and when CSI-RS is present, or decreasing the DMRS symbol density when the Instantaneous BLER is maintained lesser than the Target BLER, and CSI-RS is not used.

The step of obtaining the effective code rate achieved by the reference signal count adjustment RS—CodeRate$_{eff}$ further includes Obtaining the effective code rate RS—CodeRate$_{eff}$ after updating the reference signal pattern.

In another embodiment, the step of selecting one of the link adaptation and reference signal count adjustments based on the effective code rate includes selecting the modified RS pattern during PDSCH transmission when RS-CodeRate$_{eff}$ is greater than Link Adaptation code rate, LA-CodeRate$_{eff}$, or selecting the updated MCS index when LA-CodeRateeff is greater than the updated reference signals code rate, RS-CodeRate$_{eff}$.

Figure 22:
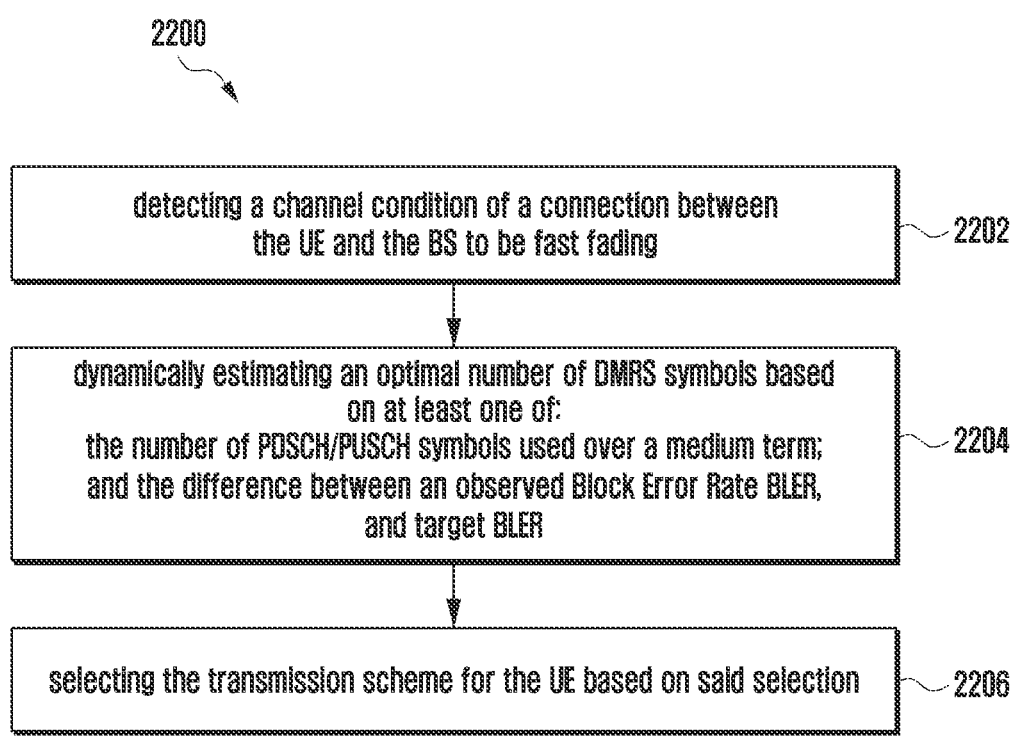
FIG. 22 illustrates a flow chart of a method of improving the throughput for User Equipment (UE) by a Base Station (BS) in a wireless communication network, according to an embodiment of the disclosure.

FIG. 22 illustrates a flow chart of a method of improving the throughput for User Equipment, UE, by a Base Station, BS, in a wireless communication network, according to an embodiment of the disclosure.

Referring to FIG. 22, the method, at operation 2202, includes detecting a channel condition of a connection between the UE and the BS to be fast fading. At operation 2204, the method includes dynamically estimating an optimal number of DMRS symbols based on at least one of the number of PDSCH symbols used over a medium-term, and the difference between an observed Block Error Rate BLER, and target BLER. The method, at operation 2206, further includes selecting a transmission scheme for the UE based on said estimation.

In another embodiment, the step of detecting 2202 the fast-fading channel conditions is based on at least one of high speed-based UE based on Doppler estimate, high rate of change of UL SINR, and high rate of change of CQI.

In another embodiment, the observed BLER is based on actual BLER measured using a sliding window of ACK/NACKs over a configured time interval, and a minimum number of samples within the time period.

In another embodiment, the step of selecting 2204 the transmission scheme for UE based on said estimation, includes increasing the DMRS symbol density when the instantaneous BLER obtained for DL transmission is greater than target BLER, and when maximum DMRS symbol count is not reached, or decreasing the DMRS symbol density when the instantaneous BLER is maintained lesser than the target BLER, and CSI-RS is not used.

Figure 23:
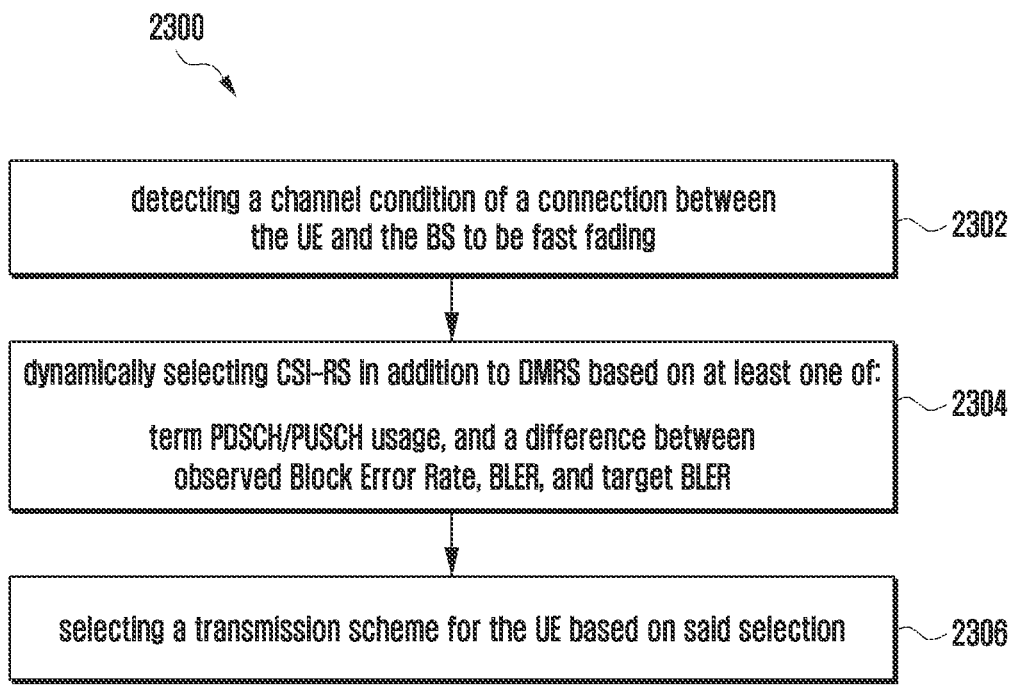
FIG. 23 illustrates a flow chart of a method of improving the throughput for User Equipment (UE) by a Base Station (BS) in a wireless communication network, according to an embodiment of the disclosure.

FIG. 23 illustrates a flow chart of a method of improving the throughput for User Equipment, UE, by a Base Station, BS, in a wireless communication network, according to an embodiment of the disclosure.

Referring to FIG. 23, method 2300, at operation 2302, includes detecting a channel condition of a connection between the UE and the BS to be fast fading. At operation 2304, the method includes dynamically selecting CSI-RS in addition to DMRS based on at least one of: a medium-term PDSCH/PUSCH usage, and a difference between observed Block Error Rate, BLER, and target BLER. The method, at operation 2306, includes selecting a transmission scheme for UE based on said selection.

In another embodiment, operation 2302 of detecting the fast-fading channel conditions is based on at least one of high speed-based UE based on Doppler estimate, high rate of change of UL SINR, and high rate of change of CQI.

In another embodiment, the observed BLER is based on actual BLER measured using a sliding window of ACK/NACKs over a configured time interval, and a minimum number of samples within the time period.

Figure 24:
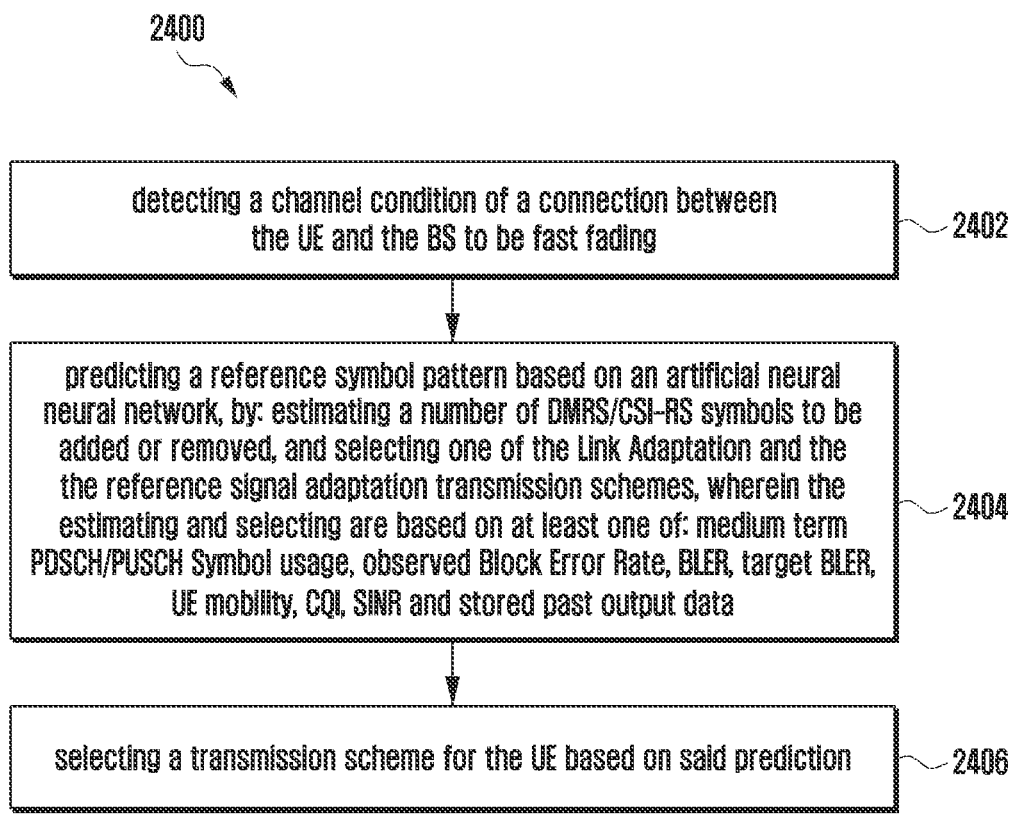
FIG. 24 illustrates a flow chart of a method 2400 of improving the throughput for User Equipment (UE) by a Base Station (BS) in a wireless communication network, based on artificial intelligence techniques, according to an embodiment of the disclosure.

FIG. 24 illustrates a flow chart of a method 2400 of improving the throughput for User Equipment, UE, by a Base Station, BS, in a wireless communication network, based on artificial intelligence techniques, according to an embodiment of the disclosure.

Referring to FIG. 24, method 2400, an operation 2402, includes detecting a channel condition of a connection between the UE and the BS to be fast fading. At operation 2404, the method includes predicting a reference symbol pattern based on an artificial neural network, by: estimating the number of DMRS/CSI-RS symbols to be added or removed and selecting one of the Link Adaptation and the reference signal adaptation transmission schemes, wherein the estimating and selecting are based on at least one of: medium-term PDSCH/PUSCH Symbol usage, observed Block Error Rate, BLER, target BLER, UE mobility, CQI, SINR and stored past output data. The method, operation 2406, includes selecting a transmission scheme for UE based on said prediction.

In another embodiment, the step of detecting the fast-fading channel conditions is based on at least one of high speed-based UE based on Doppler estimate, high rate of change of UL SINR, and high rate of change of CQI.

In another embodiment, the observed BLER is based on actual BLER measured using a sliding window of ACK/NACKs over a configured time interval, and a minimum number of samples within the time period.

Figure 25:
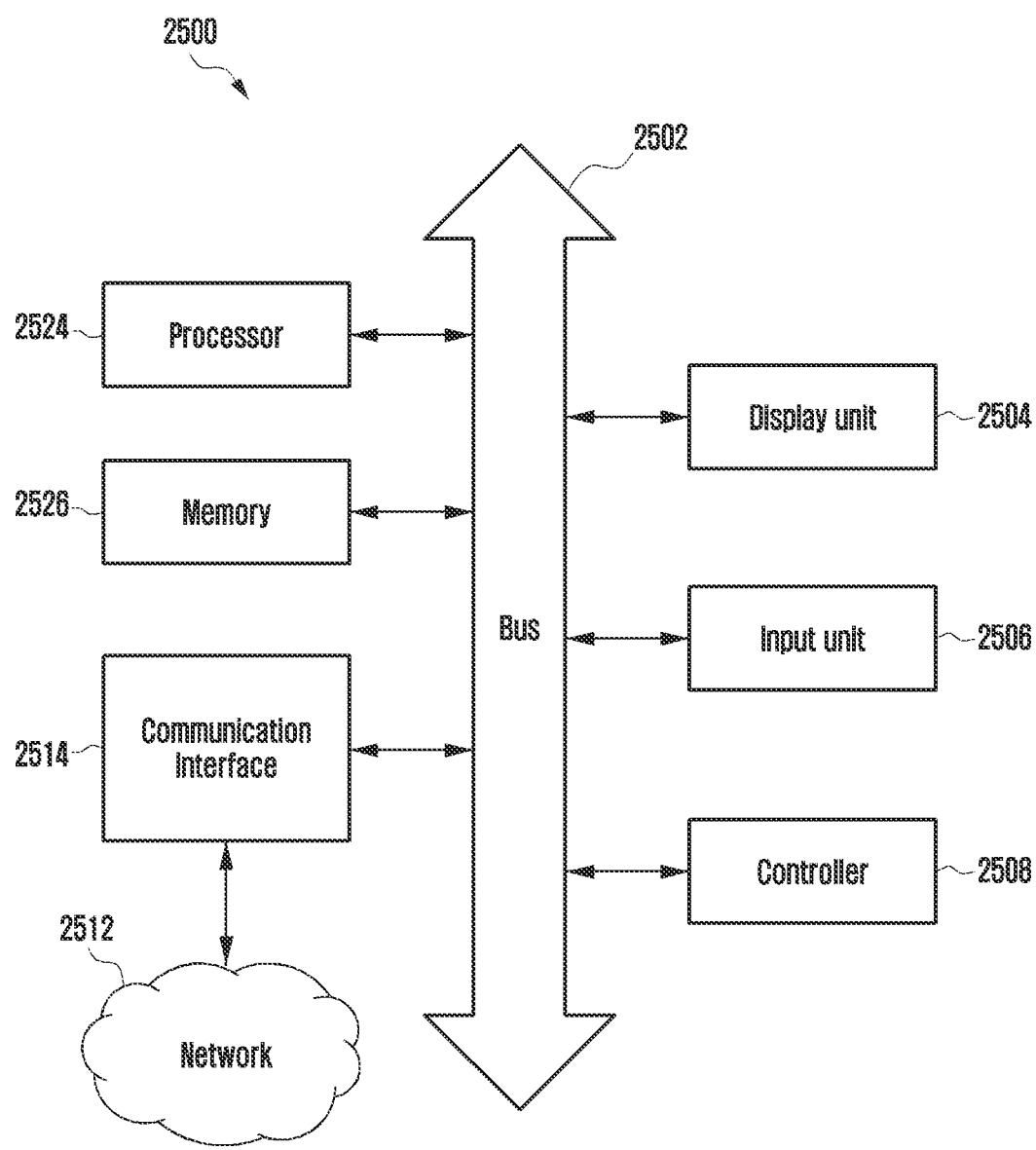
FIG. 25 illustrates a schematic representation 2500 of a system for improving the throughput for User Equipment (UE) by a Base Station (BS) in a wireless communication network, according to an embodiment of the disclosure.

FIG. 25 illustrates a schematic representation of a system 2500 for improving the throughput for User Equipment, UE, by a Base Station, BS, in a wireless communication network, according to an embodiment of the disclosure The system includes a processor 2524 coupled to a memory 2526, a display unit 2504, an input unit 2506, a controller 2508, and a communication interface 2514 connected with an external network 2512. The system further includes a bus 2502 to interconnect each of the processors 2524, the memory 2526, the display unit 2504, the input unit 2506, the controller 2508, and the communication interface 2514.

Figure 26:
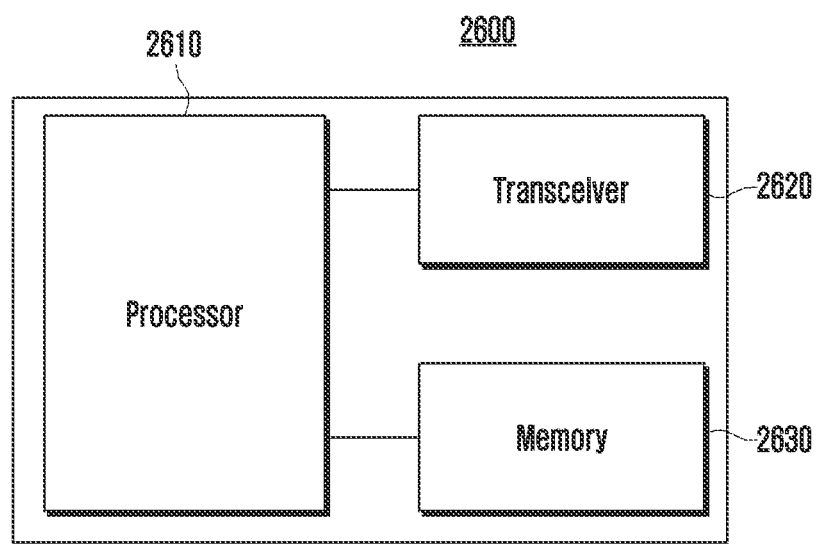
FIG. 26 illustrates an electronic device (e.g., user equipment or terminal) according to embodiments of the present disclosure.

FIG. 26 illustrates an electronic device (e.g., user equipment or terminal) according to embodiments of the present disclosure.

Referring to the FIG. 26, the electronic device 2600 may include a processor 2610, a transceiver 2620 and a memory 2630. However, all of the illustrated components are not essential. The electronic device 2600 may be implemented by more or less components than those illustrated in FIG. 26. In addition, the processor 2610 and the transceiver 2620 and the memory 2630 may be implemented as a single chip according to another embodiment.

The electronic device 2600 may correspond to electronic device described above. For example, the electronic device 2600 may correspond to the system 2500 illustrated in FIG. 25.

The aforementioned components will now be described in detail.

The processor 2610 may include one or more processors or other processing devices that control the proposed function, process, and/or method. Operation of the electronic device 2600 may be implemented by the processor 2610.

The transceiver 2620 may include a RF transmitter for up-converting and amplifying a transmitted signal, and a RF receiver for down-converting a frequency of a received signal. However, according to another embodiment, the transceiver 2620 may be implemented by more or less components than those illustrated in components.

The transceiver 2620 may be connected to the processor 2610 and transmit and/or receive a signal. The signal may include control information and data. In addition, the transceiver 2620 may receive the signal through a wireless channel and output the signal to the processor 2610. The transceiver 2620 may transmit a signal output from the processor 2610 through the wireless channel.

The memory 2630 may store the control information or the data included in a signal obtained by the electronic device 2600. The memory 2630 may be connected to the processor 2610 and store at least one instruction or a protocol or a parameter for the proposed function, process, and/or method. The memory 2630 may include read-only memory (ROM) and/or random access memory (RAM) and/or hard disk and/or CD-ROM and/or DVD and/or other storage devices.

Figure 27:
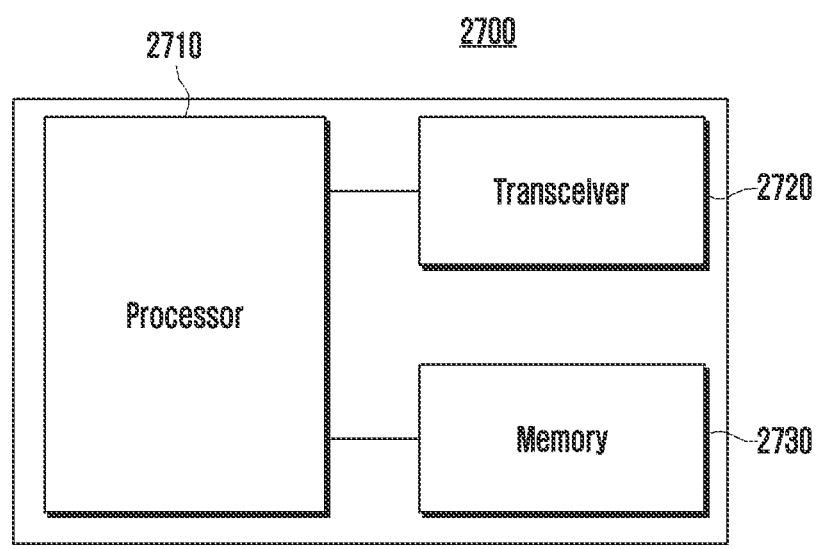
FIG. 27 illustrates a base station according to embodiments of the present disclosure.

FIG. 27 illustrates a base station according to embodiments of the present disclosure.

Referring to the FIG. 27, the base station 2700 may include a processor 2710, a transceiver 2720 and a memory 2730. However, all of the illustrated components are not essential. The base station 2700 may be implemented by more or less components than those illustrated in FIG. 27. In addition, the processor 2710 and the transceiver 2720 and the memory 2730 may be implemented as a single chip according to another embodiment.

The base station 2700 may correspond to the gNB described above. For example, the base station 2700 may correspond to the system 2500 illustrated in FIG. 25.

The aforementioned components will now be described in detail.

The processor 2710 may include one or more processors or other processing devices that control the proposed function, process, and/or method. Operation of the base station 2700 may be implemented by the processor 2710.

The transceiver 2720 may include a RF transmitter for up-converting and amplifying a transmitted signal, and a RF receiver for down-converting a frequency of a received signal. However, according to another embodiment, the transceiver 2720 may be implemented by more or less components than those illustrated in components.

The transceiver 2720 may be connected to the processor 2710 and transmit and/or receive a signal. The signal may include control information and data. In addition, the transceiver 2720 may receive the signal through a wireless channel and output the signal to the processor 2710. The transceiver 2720 may transmit a signal output from the processor 2710 through the wireless channel.

The memory 2730 may store the control information or the data included in a signal obtained by the base station 2700. The memory 2730 may be connected to the processor 2710 and store at least one instruction or a protocol or a parameter for the proposed function, process, and/or method. The memory 2730 may include read-only memory (ROM) and/or random access memory (RAM) and/or hard disk and/or CD-ROM and/or DVD and/or other storage devices.

It will be understood by those skilled in the art that various changes in form and detail may be made therein without departing from the scope of the disclosure. For example, the disclosure or at least one technical feature of the disclosure may be implemented using any combination of computer programming software, firmware, or hardware.

The memory may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The modules, amongst other things, include routines, programs, objects, components, data structures, etc., which perform particular tasks or implement data types. The modules may also be implemented as, signal processor(s), state machine(s), logic circuitries, and/or any other device or component that manipulate signals based on operational instructions.

Further, the modules can be implemented in hardware, instructions executed by a processing unit, or by a combination thereof. The processing unit can comprise a computer, a processor, a state machine, a logic array, or any other suitable devices capable of processing instructions. The processing unit can be a general-purpose processor which executes instructions to cause the general-purpose processor to perform the required tasks or, the processing unit can be dedicated to performing the required functions. In another embodiment of the disclosure, the modules may be machine-readable instructions (software) that, when executed by a processor/processing unit, perform any of the described functionalities.

The techniques of the disclosure can be detected by observing the RRC configuration message for the CSI-Reference signals. Further, this can be easily observed through Wireshark/QXDM logs.

Among several advantages with using the techniques of the disclosure, multiple DMRS symbols and additional CSI RS symbol leads to better interpolation in a fast-fading environment. Since CSI-RS allocation is across the entire BW, it has better immunity against fast fading since the impact of fast fading may not be the same across the entire BW. Better channel estimation leads to higher decoding probability, thereby lower NACKs, and higher throughput.

The method of the present disclosure improves the throughput at the UE side significantly by placing additional DMRS and CSI-RS symbols in an appropriate location. The method can be easily implemented in gNB and it does not require any specification change.

The futuristic network applications set high data rate transmission is one of the key requirements to support a variety of demands in the market. Accordingly, various options are being incorporated by the 3GPP standard body in 5G+ releases. However, it is open to use these options by the vendors based on multiple factors such as channel condition, data rate requirements, etc. In the disclosure, a framework has been proposed to adaptively select the pilot pattern for the channel conditions. The cost function for the optimal pilot pattern selection is derived. It is evident from the simulation results that, the proposed approach gives significant gain due to improvement in the transmission code rate. This will possibly improve the overall system throughput significantly. The proposed solution can be easily adopted in any 5G NR system with less implementation complexity. This work can be extended by considering different reference signal patterns and channel models for multiple UE scenarios. Further, the proposed technique can be evaluated with the complete 5G NR system blocks.

The disclosure can be implemented for (i) the Frequent RRC reconfigurations for addition/removal of DMRS/CSI-RS especially for a high mobility UE., (ii) PDSCH/PUSCH allocations containing a dynamically varying number of symbols for DMRS, and (iii) CSI-RS symbol position getting added for a high mobility UE when it has the maximum number of DMRS symbols configured.

A few of the major advantages of the disclosure are:

Multiple DMRS symbols and additional CSI RS symbol leads to better interpolation in a fast-fading environment. Better channel estimation leads to higher decoding probability, thereby lower NACKs, and Reduced BLER.

Most optimal UE throughput is based on a choice between LA and RS density optimization.

UE transmit power reduction due to better BER achievable at lower SNR.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed:

1. A method performed by a base station in a communication system, the method comprising:
   identifying that a channel condition of a user equipment (UE) is fading;
   identifying, based on the channel condition being fading, a first estimated throughput and a second estimated throughput, wherein the first estimated throughput is obtained based on an updated modulation and coding scheme (MCS) for data for the UE and the second estimated throughput is obtained based on an updated reference signal (RS) configuration for the UE including an updated number of RS symbols in a slot;
   comparing the first estimated throughput with the second estimated throughput;
   transmitting, to the UE, information associated with the updated MCS in case that the first estimated throughput is higher than the second estimated throughput; and
   transmitting, to the UE, information associated with the updated RS configuration in case that the second estimated throughput is higher than the first estimated throughput.

2. The method of claim 1, wherein the channel condition is identified based on at least one of Doppler estimate, uplink (UL) signal-to-interference-plus-noise ratio (SINR), or channel quality indicator (CQI).

3. The method of claim 1, wherein the updated RS configuration is based on at least one of CQI, UL SINR, configurable number of physical downlink shared channels (PDSCHs) and hybrid automatic repeat request (HARQ) acknowledgement (ACK) within a period, or configurable number of physical uplink shared channels (PUSCHs) and HARQ ACK within a period.

4. The method of claim 1, wherein the first estimated throughput is identified based on an erstwhile RS configuration before the updated RS configuration.

5. The method of claim 1,
   wherein the first estimated throughput is associated with a first effective code rate obtained based on the updated MCS and the second estimated throughput is associated with a second effective code rate obtained based on the updated RS configuration.

6. The method of claim 5, wherein the first effective code rate is based on an available number of resource elements (REs) for the data and the updated MCS determined by a link adaptation algorithm.

7. The method of claim 1,
wherein the updated number of RS symbols is-based on at least one of PDSCH usage, PUSCH usage, observed block error rate (BLER), or target BLER.

8. The method of claim 1,
wherein the updated number of RS symbols is increased in case that an average number of data symbols within a period is greater than a predetermined threshold, and
wherein the updated number of RS symbols is decreased in case that the average number is less than a predetermined threshold.

9. A base station in a communication system, the base station comprising:
a transceiver; and
a processor coupled with the transceiver and configured to:
identify that a channel condition of a user equipment (UE) is fading,
identify, based on the channel condition being fading, a first estimated throughput and a second estimated throughput, wherein the first estimated throughput is obtained based on an updated modulation and coding scheme MCS) for data for the UE and the second estimated throughput is obtained based on an updated reference signal (RS) configuration for the UE including an updated number of RS symbols in a slot,
compare the first estimated throughput with the second estimated throughput,
transmit, to the UE, information associated with the updated MCS in case that the first estimated throughput is higher than the second estimated throughput, and
transmit, to the UE, information associated with the updated RS configuration in case that the second estimated throughput is higher than the first estimated throughput.

10. The base station of claim 9, wherein the channel condition is identified based on at least one of Doppler estimate, uplink (UL) signal-to-interference-plus-noise ratio (SINR), or channel quality indicator (CQI).

11. The base station of claim 9, wherein the updated RS configuration is based on at least one of CQI, UL SINR, configurable number of physical downlink shared channels (PDSCHs) and hybrid automatic repeat request (HARQ) acknowledgement (ACK) within a period, or configurable number of physical uplink shared channels (PUSCHs) and HARQ ACK within a period.

12. The base station of claim 9, wherein the first estimated throughput is identified based on an erstwhile RS configuration before the updated RS configuration.

13. The base station of claim 9, wherein the first estimated throughput is associated with a first effective code rate obtained based on the updated MCS and the second estimated throughput is associated with a second effective code rate obtained based on the updated RS configuration.

14. The base station of claim 13, wherein the first effective code rate is based on an available number of resource elements (REs) for the data and the updated MCS determined by a link adaptation algorithm.

15. The base station of claim 9, wherein the updated number of RS symbols is based on at least one of PDSCH usage, PUSCH usage, observed block error rate (BLER), or target BLER.

16. The base station of claim 9, wherein the updated number of RS symbols is increased in case that an average number of data symbols within a period is greater than a predetermined threshold, and
wherein the updated number of RS symbols is decreased in case that the average number is less than a predetermined threshold.

17. A method performed by a user equipment (UE) in a communication system, the method comprising:
transmitting, to a base station, feedback information;
receiving, from the base station, information associated with an updated modulation and coding scheme (MCS) in case that a first estimated throughput is higher than a second estimated throughput and a channel condition of the UE is fading; and
receiving, from the base station, information associated with an updated reference signal (RS) configuration including an updated number of RS symbols in a slot in case that the second estimated throughput is higher than the first estimated throughput and the channel condition of the UE is fading,
wherein the channel condition is associated with the feedback information,
wherein the first estimated throughput is associated with the updated MCS and the second estimated throughput is associated with the updated RS configuration.

18. A user equipment (UE) in a communication system, the UE comprising:
a transceiver; and
a processor coupled with the transceiver and configured to:
transmit, to a base station, feedback information,
receive, from the base station, information associated with an updated modulation and coding scheme (MCS) in case that a first estimated throughput is higher than a second estimated throughput and a channel condition of the UE is fading, and
receive, from the base station, information associated with an updated reference signal (RS) configuration including an updated number of RS symbols in a slot in case that the second estimated throughput is higher than the first estimated throughput and the channel condition of the UE is fading,
wherein the channel condition is associated with the feedback information,
wherein the first estimated throughput is associated with the updated MCS and the second estimated throughput is associated with the updated RS configuration.

* * * * *